United States Patent
Boaz

(10) Patent No.: US 7,304,587 B2
(45) Date of Patent: Dec. 4, 2007

(54) AUTOMATED METER READING SYSTEM, COMMUNICATION AND CONTROL NETWORK FOR AUTOMATED METER READING, METER DATA COLLECTOR PROGRAM PRODUCT, AND ASSOCIATED METHODS

(75) Inventor: Jon A. Boaz, Colleyville, TX (US)

(73) Assignee: Energy Technology Group, Inc., Fort Worth, TX (US)

( * ) Notice: Subject to any disclaimer, the term of this patent is extended or adjusted under 35 U.S.C. 154(b) by 387 days.

(21) Appl. No.: 11/120,173

(22) Filed: May 2, 2005

(65) Prior Publication Data

US 2005/0270173 A1    Dec. 8, 2005

Related U.S. Application Data

(63) Continuation-in-part of application No. 10/779,429, filed on Feb. 13, 2004.

(60) Provisional application No. 60/447,815, filed on Feb. 14, 2003.

(51) Int. Cl.
    *G08B 23/00* (2006.01)
(52) U.S. Cl. ............. 340/870.02; 375/132; 379/106.03
(58) Field of Classification Search ........... 340/870.02, 340/870.03; 375/132; 370/238; 379/106.03
    See application file for complete search history.

(56) References Cited

U.S. PATENT DOCUMENTS

| | | | |
|---|---|---|---|
| 3,806,875 A | 4/1974 | Georget | |
| 4,120,031 A | 10/1978 | Kincheloe et al. | |
| 4,803,484 A | 2/1989 | Schutrum et al. | |
| 4,811,011 A | 3/1989 | Sollinger | |
| 5,115,433 A | 5/1992 | Baran et al. | |
| 5,128,988 A | 7/1992 | Cowell et al. | |

(Continued)

FOREIGN PATENT DOCUMENTS

WO    WO 94/29825 A    12/1994

(Continued)

OTHER PUBLICATIONS

J. Glas, article titled "The Priniciples of Spread Spectrum Communication", dated Jan. 22, 1996, found at http:/cas.et.tudelft.nl/~glas/ssc/techOld/.

(Continued)

*Primary Examiner*—Albert K. Wong
(74) *Attorney, Agent, or Firm*—Bracewell & Giuliani LLP

(57) ABSTRACT

An automated meter reading network system to collect utility usage data from multiple utility meters having utility meter sensors is provided. The system includes multiple meter data collectors each in communication with one or more utility meters to collect utility usage data and forming a wireless mesh communications network characterized by having a varying frequency mode of operation. The system also includes a host computer in communication with the meter data collectors either directly or through multiple field host data collectors, which can be connected to the host computer through a wide area network. The system also includes a meter data collector program product at least partially stored in the memory of the host computer adapted to manage the mesh communication network that is adapted to vary the frequency mode of at least portions of the mesh communication network between a fixed frequency mode and a frequency hopping spread spectrum mode to enhance network performance.

31 Claims, 11 Drawing Sheets

U.S. PATENT DOCUMENTS

| | | | |
|---|---|---|---|
| 5,239,294 | A | 8/1993 | Flanders et al. |
| 5,265,150 | A | 11/1993 | Heimkamp et al. |
| 5,282,204 | A | 1/1994 | Shpancer et al. |
| 5,295,154 | A | 3/1994 | Meier et al. |
| 5,323,384 | A | 6/1994 | Norwood et al. |
| 5,438,329 | A * | 8/1995 | Gastouniotis et al. .. 340/870.02 |
| 5,467,345 | A | 11/1995 | Cutler et al. |
| 5,559,894 | A | 9/1996 | Lubliner et al. |
| 5,568,399 | A | 10/1996 | Sumic |
| 5,589,834 | A | 12/1996 | Weinberg |
| 5,592,491 | A | 1/1997 | Dinkins |
| 5,708,655 | A | 1/1998 | Toth |
| 5,732,078 | A | 3/1998 | Arango |
| 5,737,400 | A | 4/1998 | Bagchi et al. |
| 5,748,619 | A | 5/1998 | Meier |
| 5,757,783 | A | 5/1998 | Eng et al. |
| 5,790,938 | A | 8/1998 | Talarmo |
| 5,856,791 | A | 1/1999 | Gray et al. |
| 5,907,540 | A | 5/1999 | Hayashi |
| 5,960,074 | A | 9/1999 | Clark |
| 5,978,364 | A | 11/1999 | Melnik |
| 6,026,651 | A | 2/2000 | Sandelman |
| 6,029,092 | A | 2/2000 | Stein |
| 6,044,062 | A | 3/2000 | Brownrigg et al. |
| 6,069,571 | A | 5/2000 | Tell |
| 6,073,169 | A | 6/2000 | Shuey et al. |
| 6,078,785 | A | 6/2000 | Bush |
| 6,088,659 | A | 7/2000 | Kelley et al. |
| 6,163,602 | A | 12/2000 | Hammond et al. |
| 6,172,616 | B1 | 1/2001 | Johnson et al. |
| 6,177,884 | B1 | 1/2001 | Hunt et al. |
| 6,199,068 | B1 | 3/2001 | Carpenter |
| 6,249,516 | B1 | 6/2001 | Brownrigg et al. |
| 6,259,972 | B1 | 7/2001 | Sumic et al. |
| 6,329,928 | B1 | 12/2001 | Hershey |
| 6,333,975 | B1 | 12/2001 | Bruun et al. |
| 6,346,875 | B1 | 2/2002 | Puckette et al. |
| 6,363,057 | B1 | 3/2002 | Ardalan et al. |
| 6,396,839 | B1 | 5/2002 | Ardalan et al. |
| 6,496,575 | B1 | 12/2002 | Vasell et al. |
| 6,654,379 | B1 | 11/2003 | Grover et al. |
| 6,657,552 | B2 | 12/2003 | Belski et al. |
| 6,731,223 | B1 | 5/2004 | Partyka |
| 6,747,571 | B2 * | 6/2004 | Fierro et al. ........... 340/870.02 |
| 6,996,154 | B2 * | 2/2006 | Haas ......................... 375/132 |
| 7,020,701 | B1 | 3/2006 | Gelvin et al. |
| 7,054,271 | B2 | 5/2006 | Brownrigg et al. |
| 7,061,924 | B1 | 6/2006 | Durrant et al. |
| 2002/0109607 | A1 | 8/2002 | Cumeralto et al. |
| 2003/0128134 | A1* | 7/2003 | Fierro et al. ........... 340/870.02 |
| 2005/0055432 | A1 | 3/2005 | Rodgers et al. |
| 2006/0074811 | A1* | 4/2006 | Ferguson et al. ............. 705/57 |
| 2006/0098576 | A1 | 5/2006 | Brownrigg et al. |

FOREIGN PATENT DOCUMENTS

| | | |
|---|---|---|
| WO | WO 95/34177 | 12/1995 |
| WO | WO 96/18982 A | 6/1996 |

OTHER PUBLICATIONS

P. Bahl, et al.; article titled "SSCH: Slotted Seeded Channel Hopping for Capacity Improvement in IEEE 802.11 Ad-Hoc Wireless Networks", presented at the 10th International Conference on Mobile Computing and Networking, 1994, found at http://portal.acm.org/citation.cfm/.

M. Medidi, et al., article titled "A Distributed Algorithm for Mesh Scatternet Formation in Bluetooth Networks", presented at International Conference on Wireless Networks 2004, found at www.inforamtik.uni-trier.de/~ley/db/conf/icwn/icwn2002-1.html.

J. Gass, et al.; article titled "A Comparison of Slow-Frequency-Hop and Direct-Sequence Spread-Spectrum Systems For Different Multipath Delay Profiles", presented at IEEE Military Communications Conference MILCOM 97 Papers, and found at www.argreenhouse.com/society/TacCom/milcom_97_papers.shtml.

Energy Technology Group, Inc., Installation Guide RCR-14, "Transforming Utility Data Collection", dated May 19, 2003.

Kahn, Robert E., Gronemeyer, Steven A., Burchfiel, Jerry, and Kunzelman, Ronald C., "*Advances in Packet Radio Technology,*" IEEE Nov. 1978, vol. 66, No. 11, pp. 1468-1496.

Perkins, Charles E. and Bhagwat, Pravin, "*Highly Dynamic Destination-Sequenced Distance-Vector Routing* (DSDV) for Mobile Computers,"SIGCOMM 94-Aug. 1994 London England UK, 1994 ACM 0-89791-682-4/94/0008, pp. 234-244.

Wu, Jie, "*Distributed System Design.*" ISBN 0-8493-3178-1, Boca Raton, Fl., CRC Press LLC 1999, pp. 177-180 and 204.

Jubin, John and Tornow, Janet D., "*The DARPA Packet Radio Network Protocols,*" Proceedings of the IEEE, vol. 75, No. 1, Jan. 1987, pp. 21-32.

Kleinrock, Leonard and Kamoun, Frouk, "*Hierarchical Routing for Large Networks,*" North-Holland Publishing Company, Computer Networks 1, 1997, pp. 155-174.

Frankel, Michael S., Packet Radios Provide Link for Distributed, Survivable $C^3$ in Post—Attack Scenarios, MSN Jun. 1983.

Lauer, Greg et al., "Communications in the Information Age," pp. 15.1.1-15.1.4, IEEE Globecom '84, 1984.

WestCott, Jil A., "Issues in Distributed Routing for Mobile Packet Radio Network," IEEE 1982, pp. 233-238.

Westcott, Jil et al., "A Distributed Routing Design for a Broadcast Environment", IEEE 1982, pp. 10.4-1-10.4-5.

Kahn, Robert E., The Organization of Computer Resources into a Packet Radio Network, IEEE Jan. 1977, vol. Com-23, No. 1, pp. 169-178.

MacGregor, William et al., "Multiple Control Stations in Packet Radio Networks," IEEE 1982, pp. 10.3-1-10.3-5.

Shacham, Nachum et al., "Future Directions in Packet Radio Technology,"IEEE 1985, pp. 93-98.

Jubin, John, "Current Packet Radio Network Protocols,"IEEE 1985, pp. 86-92.

Gower, Neil et al ., "Congestion Control Using Pacing in a Packet Radio Network," IEEE 1982, pp. 23.1-1-23.1-6.

Wey , Jyhi-Kong, Chang, Han-Tsung, Sun Lir-Fan and Yang, Wei-Pang, *Clone Terminator: An Authentication Services for Advanced Mobile Phone System.*

Davis, Alvah B and Goyal, Shri K., "*Knowledge-Based Management of Cellular Clone Faud.*" *IEEE 1992*, pp. 230-234.

Schacham, et al., "A Packet Radio Network For Library Automation", published by IEEE in Oct. 1978, p. 21.3.1. to 21.3.7.

Clifford Lynch et al, "Packet Radio Networks: Architectures, Protocols, Technologies and Applications" published by Pergamon Press in 1989, pp. 1 to 166 and pp. 211 to 274.

Edward Brownrigg, "User Provided Access to the Internet", found at http:/web.simmons.edu, Jun. 9, 2005.

* cited by examiner

FIG. 10.

AUTOMATED METER READING SYSTEM, COMMUNICATION AND CONTROL NETWORK FOR AUTOMATED METER READING, METER DATA COLLECTOR PROGRAM PRODUCT, AND ASSOCIATED METHODS

RELATED APPLICATIONS

This application is a continuation-in-part of and claims the benefit of U.S. patent application Ser. No. 10/779,429 filed on Feb. 13, 2004, which claims the benefit of U.S. application Ser. No. 60/447,815, filed on Feb. 14, 2003, both of which are incorporated herein by reference in their entirety.

BACKGROUND

1. Field of the Invention

The present invention relates in general to the field of utility meters. More particularly, the present invention relates to systems, automated equipment, networks, program products, and related methods for remote reading of utility meters.

2. Description of Related Art

Utility companies and municipalities for many years have been burdened with the labor intensive and cumbersome task of manually collecting meter readings, managing data from the field into the accounting area, and managing the billing and collection of invoices. Typically each customer is provided with a mechanical utility meter for each individual service provided, for example, a meter for water, a meter for steam, a meter for gas, and a meter for electric power. A periodic reading of the utility meter is necessary to determine the usage and to bill the customer for the amount used. These meters are normally manually read using utility company or municipality employees physically visiting each meter at the customer's location, reading the meter, and recording the previous month's usage into a written route book for delivery to accounting personnel. This process is costly, is time consuming, and can involve various risks to personnel involved in manually collecting meter data. The process involves labor, motorized transportation, and numerous employee overhead-related costs. Once the readings from the meter are obtained, accounting personnel manually transfer the readings into a database for billing and collection of the invoices for service.

Manually reading the meters often results in numerous other expenses including those related to human error. For example, a high bill caused by an incorrect manual read or estimated read often motivates customers to pay later, resulting in increased working capital requirements and corresponding expenses for the utility. Additionally, the utility has to handle the customer complaints (a call center cost) and may have to read the meter again to verify the error. As the complaint progresses, the utility faces administrative costs associated with routing and processing the complaint from the call center to the meter department. An additional cost includes the potential loss of a customer who, even after resolution, feels the process was such an excessive burden as to prompt the customer to switch utility providers.

Recently, hand-held reading units have been developed that typically provide a data collection unit attached to the consumer's utility meter having a data transmitter and data receiver. One methodology of hand-held "local" collecting meter reading, such as that shown in U.S. Pat. No. 5,559,894 by Lubliner et al. titled "Automated Meter Inspection and Reading" and U.S. Pat. No. 5,856,791 by Gray et al. titled "Port Expander For Utility Meter Reading," requires an operator having a meter or collection unit interrogation device to be in close physical proximity of the meter to obtain the meter reading and transport the data to a central computer. For example, in a radio drive-by or walk-by unit, a utility service vehicle having a mobile receiver mounted in a service vehicle or a utility worker having a hand-held unit passes by the customer's facility to receive the data from the meter. As the vehicle or hand-held unit passes near the electric meter, the receiver emits a signal to the collection unit, which causes the collection unit to transmit or send its meter reading data to the receiver. This consumption data is then stored and later entered into a billing system. This approach, however, still requires the manual visit to each meter location and time downloading the data to the billing system. Nevertheless, the physical meters can be read much more quickly which reduces manpower, vehicular, and soft costs. Also, the data is transferred from the mobile receiver to the database, which again reduces manpower and data handling. This methodology also has a benefit to the customer of preventing intrusion into the customer's premises and improved accuracy of the reading. Realization difficulties can include prohibitive capital costs, i.e., vehicles, and software and hardware requirements, and access to a reliable and cost-effective power for the individual radio transmitter in the individual meters.

Recently, automated meter reading has been developed. Automated meter reading has become more desirable than using meters that require manual reading and recording of the consumption levels. Automated meter reading consists of technologies and methods to remotely read a plurality of electric meters, such as a consumer base for an electric power supply company, into a billing database by installing or utilizing fixed networks that allow billing or meter usage data to be transmitted without human intervention to a host computer having the billing database. Automated meter reading produces many benefits. Several companies, such as Hunt Technologies, Schlumberger, CellNet, Itron, Amco Automated Systems, and Distribution Control Systems, have developed automated meter-reading units. For the utility, reading meters without setting foot on customer's property substantially reduces risks associated with climbing over fences, slipping on ice and snow, dangerous animals, snakes, and spiders, and other types of risks which in turn, result in significant savings in liability insurance, disability benefits, and worker turnover/replacement. For the customer, reading meters without entering a customer's property provides a less intrusive service and reduces criminal activity, such as when a criminal manages to gain entry into a customer's property by posing as a meter reader. Moreover, the need for a higher frequency of meter reading is increasing, e.g., daily, hourly, or every 15 minutes, in order to take advantage of real time pricing. When utilities such as gas, electricity, or water are most expensive to the customer, they are also correspondingly most expensive to the utility company. Also, the amount of data is increasing, due to the necessity to bill on more than just consumption, e.g., time of use. Thus, automated recording and reporting of the utility usage at customer sites is rapidly replacing the manually read utility meters.

As shown in U.S. Pat. No. 6,163,602 by Hammond et al. entitled "System and Method for Unified Telephone and Utility Consumption Metering, Reading, and Processing" and U.S. Pat. No. 5,128,988 by Cowell et al. entitled "Telephone Switched Network, Automatic Meter-Reading System Based Upon Service Address," automated meter reading systems can use a dial-up modem in the collection unit to dial a remote billing system and transmit its reading data via telephone lines. In the past, there has been on-site meter reading equipment having a modem capable of receiving telephone calls from a central office through the use of special equipment located at the telephone company, and there has also been on-site meters with modems which were capable of placing telephone calls to the central office. In general, these systems incorporate an auto-dial, auto-answer modem in each customer site to receive interrogation signals from the telephone line and to formulate and transmit meter readings via the telephone line to the utility company. These systems record information on utility usage and periodically dial into a central office to report the utility usage for recording and billing purposes. This methodology provides two-way communication and control between the meter and the central office. The modem shares the telephone line with the customer's normal usage, such as incoming and outgoing voice communications. Such sharing requires that the system be able to recognize when the telephone line is in use, and to delay demanding use of the telephone line until it is free. Steps must be taken to prevent the data communications system from interfering with other uses and to prevent other uses from corrupting the transmitted data.

A variation of this methodology includes using the power line as a carrier medium. This approach connects the meter through the power lines and relays the meter reading to the utility company over the power lines. This approach, however, can require a complicated infrastructure to be installed. Power lines operate as very large antennas and can receive a large amount of noise. Therefore, signal-cleaning filters must be installed periodically along the power lines to attenuate the noise. These filters can be very expensive. Also, the connections often are at line voltage, making it more dangerous and time consuming to install.

Another problem with expanding the use of control systems technology to such distributed systems are the costs associated with the sensor-actuator infrastructure required to monitor and control functions within such systems. A more modem approach to implementing control system technology is to install a local network of hard-wired sensors and actuators along with a local controller. Not only is there the expense associated with developing and installing appropriate sensors and actuators, but there is the added expense of connecting functional sensors and controllers with the local controller and the cost of the local controller. This methodology is also quite intrusive as the cables must be run to physically interconnect the various nodes in the network. An alternative variation includes interfacing the meter with a community cable television system. In addition to the high cost of installation, however, such a system is not useable in areas without access to a cable system. Moreover, networks that are interconnected with cables are subject to physical disruption of the cables.

Recently, wireless networks have been developed. These networks, typically installed in a point-to-point loop configuration, are used to collect information from and to disseminate information to individual nodes of the network. In conventional wireless networks using a point-to-point loop configuration, each node in the network is interconnected and communicates with two neighboring nodes. Information or commands are passed from node to node around the point-to-point loop until they arrive at a master node. The master node is used to communicate information that is gathered to a central station or to accept and distribute information received from a central station throughout the network. These conventional wireless networks, however, have limitations. For example, because these conventional wireless networks generally have a point-to-point loop configuration, when one node is disabled, the integrity of the entire network can be affected. Moreover, if the master node of such a conventional network is disabled, the network can become isolated.

Other variations in methodology include using data channels in wireless telephone systems to transmit usage data to a remote billing system via a wireless telephone network, such as PCS, satellite, or cellular. Other methodologies also include the use of low earth orbiting satellites. Building, launching and maintaining a fleet of satellites, however, is very expensive.

Yet another methodology includes the use of small RF transmitters. Because systems having sufficient range normally are subject to regulations and licensing requirements that are prohibitively expensive, centralized wireless control systems for locally distributed devices using RF transmitters have not been widely utilized. Also, systems that are sufficiently powerful to be used in widely distributed installations are unnecessarily expensive in smaller installations. Additionally, there is limited availability of RF carrier frequencies and potential interference with other nearby systems that might be operational.

In an attempt to address the metering data management needs of entities involved in energy distribution, automated meter reading servers have been developed, such as shown in U.S. Pat. No. 6,088,659 by Kelley et al. titled "Automated Meter Reading System." Such automated meter reading servers use an open, distributed architecture that collects, loads, and manages system-wide data collected from energy meters, and routes data automatically to upstream business systems. Although such automated meter reading servers may address some meter data management concerns, these systems still fail to address communication concerns set forth above with respect to collecting billing or usage data and transmitting the data to a control center having such an automated meter reading server.

In view of the foregoing, the Applicant has recognized a need to automate and transform the process of metering electricity, gas, water, steam, and the like, while reducing costs, adding value, enhancing service, and decreasing time of collection. Accordingly, Applicant has also recognized a need for control systems technology to control such distributed systems and that provides the customer with information to reduce costs and help the utility by reducing demand at peak hours. Applicant has further recognized a need for a fixed network automated meter reading solutions that includes a multifunction data collector capable of transmitting meter readings for multiple meters to the control center and capable of relaying meter readings of other collectors.

SUMMARY OF THE INVENTION

In view of the foregoing, embodiments of the present invention advantageously provide an automated utility meter reading network system, utility meter data collector, and methods related to an automated data acquisition and energy management. Embodiments of the present invention also provide an automated meter reading network system that supports bi-directional communications with a network of meter data collectors capable of collecting digital and analog input data, as well as providing functional control of various customer equipment via a digital output board or relay. Embodiments of the present invention advantageously provide a distributed network system to collect and analyze utility usage data that includes sensors interfaced with or connected to utility meters, which provide utility meter readings (utility usage data) to the meter data collectors. Embodiments of the present invention also include a remote automated meter reading control center including a host computer, e.g., a server, for gathering and processing the utility usage data.

Advantageously, the meter data collectors can be located at a customer location, such as, for example, mounted to a residence or other building structure and can each be connected to all utility meters at a respected customer location. The meter data collectors can monitor utility usage data through multiple digital or analog inputs and/or multiple encoded inputs, and can transmit that data to a host computer, preferably located at a utility's central office via a preferably 902-928 mega-hertz and/or 2.4 gigahertz combination fixed frequency/frequency hopping mesh network. The meter data collectors can utilize a medium to high range radio frequency (RF) transceiver capable of communications of 1600 meters or approximately one mile with field host data collectors that connect the network to a wireless, cable, fiber, or telephony wide area network. The field host data collectors can reside at a municipality infrastructure level, such as a substation, pump station, or municipal office. The field host data collectors can collect utility usage data from the surrounding meter data collectors, intermediate collectors, and/or other field host data collectors, and can transmit, preferably in batch format, that utility usage data either when requested by the host computer or periodically at a predetermined interval.

More specifically, an embodiment of the present invention provides an automated meter reading network system including at least one but preferably a plurality of utility meters, e.g., water, gas, steam, electric, and/or other, each located at each separate customer site. A plurality of sensors are correspondingly each interfaced with and positioned adjacent a separate one of the plurality of utility meters to thereby sense utility usage data from each of the plurality of utility meters. A plurality of meter data collectors are each preferably positioned adjacent one or more of the utility meters and in communication with one or more of the sensors to collect the utility usage data. Each meter data collector can be configured to collect data from 20 metering inputs and can be upgraded with a digital output board for device control. An analog input module allows for monitoring of customer equipment, providing municipalities the ability to create additional revenue sources. For example, if equipped with the analog input module, each meter data collector can monitor air-conditioning performance points, such as pressure and temperature. All metering data can be date and time stamped, providing an accurate record of the exact day and time the customer's meters are read.

Each of the meter data collectors can include a radio frequency telemetry module to transmit the utility usage data. Correspondingly, each meter data collector can be positioned spaced apart from and in cross-radio frequency communication with at least one other meter data collector to define and form a mesh communication network. The meter data collectors can act as a repeater as well as a collection unit creating a communications network with self-healing and self-determining characteristics. Advantageously, this network configuration creates its own infrastructure as additional meter data collectors are added to the mesh communications network. Further, advantageously the mesh network configuration can be divided into a plurality of radially expanding network levels whereby meter data collectors at a first network level would communicate with meter data collectors at a second network level, and so on, through each network level.

The automated meter reading network system can also includes a plurality of field host data collectors, each positioned spaced apart from the other ones of the plurality of field host data collectors and each in radio frequency communication with at least one but preferably a plurality of the meter data collectors, to request and collect utility usage data from the plurality of meter data collectors. The combination of field host data collectors and the meter data collectors further define and form the mesh communication network. As such, each of the field host data collectors and the meter data collectors form an array of communication nodes having overlapping and interconnected coverage areas. This network configuration helps reduce line-of-site communication problems between each of the plurality of communication nodes, beyond what would be possible if the mesh communications network were entirely wireless. The field host data collectors can reside at the municipality infrastructure level, such as at a substation, pump station, or municipal office, and can connect the mesh communications network to a wireless, cable, fiber or telephony WAN. Advantageously, each of the field host data collectors can be used as routers and repeaters, eliminating a requirement for an expensive infrastructure build-out. Advantageously, this configuration also allows for data transfer over varying types of network configurations between a host computer and the field host data collectors, including over the pre-existing public telephone networks.

The field host data collectors can have either pass-through or intelligent configurations. Intelligent field host data collectors can collect meter data from surrounding meter data collectors or other host field data collectors and can transmit the data to the host computer either automatically or when requested to do so. The pass-through field host data collectors can provide direct contact between surrounding meter data collectors and the host computer, or an intermediate computer that is in communication with the host computer associated with the pass-through field host data collector. The field host data collectors have or can have access to a memory to store and process the collected utility usage data. The utility usage data is preferably stored in a database or consumption file, in batch format, to advantageously enhance data processing and customer billing.

The host computer is generally located remote from the field host data collectors and most of the meter data collectors, and is positioned in communication with each of the field host data collectors and each of the meter data collectors, to provide instructions thereto. The host computer is also in communication with the field host data collectors to request and receive the utility usage data. The host computer can analyze the utility meter or usage data to provide services, such as utility usage analysis, utility bill presentation via the Internet, historical utility data, utility leak detection, power outage detection, and current near real-time utility readings and usage. Providing the customer such near real-time feedback on current energy usage and near real-time utility meter-read verification can advantageously lessen billing disputes and reduce customer service overhead costs. Advantageously, the host computer can also provide appliance control and community-wide message delivery.

The automated meter reading network system also includes a meter data collector program product, at least partially stored in the memory of the host computer, that includes a set of instructions adapted to manage the mesh communication network. The meter data collector program product is capable of querying each meter data collector and assigning the meter data collector a physical location based on the actual physical location with reference to other collectors or "nodes." The meter data collector program product is adapted to vary the radio frequency mode between a fixed radio frequency mode and a frequency hopping spread spectrum mode, to thereby enhance mesh communication network performance. The fixed radio frequency mode advantageously provides for message broadcasting across at least portions of the network when not encountering substantial network interference. The frequency hopping spread spectrum mode provides the system an ability to circumvent substantial network interference when encountering such interference.

Embodiments of the present invention also advantageously provide a method of collecting utility meter usage data from a plurality of utility meters having utility meter sensors in communication with a plurality of communication nodes forming a mesh network having a variable radio frequency mode. For example, a method according to an embodiment of the present invention includes determining a communication sequence to each of the plurality of communication nodes responsive to a determined strength of a communication signal between each of the plurality of communication nodes to define a preferred communication sequence path to each of the plurality of communication nodes from the host computer; and enhancing mesh communication network performance by varying the radio frequency mode of the network between a fixed radio frequency mode and a frequency hopping spread spectrum mode. The fixed radio frequency mode can be, for example, selected to provide message broadcasting across at least portions of the network when not encountering substantial network interference. The frequency hopping spread spectrum mode can be, for example, selected to circumvent substantial network interference when encountering such substantial network interference.

The method can also include the steps of: switching the radio frequency mode of at least a portion of the network from a fixed frequency mode having a first frequency to a frequency hopping spread spectrum mode having a plurality of the preselected frequencies, responsive to detection of network interference from a narrow-band noise signal; determining a second frequency not affected by the narrow-band noise signal, responsive to the frequency hopping; and switching the radio frequency mode of the at least a portion of the network from the frequency hopping spread spectrum mode to the fixed frequency mode having the second frequency. Additionally, the preferred communication sequence path can be updated periodically to allow the preferred communication sequence path to vary over time. According to an embodiment of the present invention, the preferred communication sequence path is selected to maximize the number of communication nodes in the communications path for at least a portion of the mesh indication network and/or can be selected to minimize network congestion.

Embodiments of the present invention also advantageously provide a computer readable medium that is readable by a computer collecting utility meter usage data. For example, a computer readable medium according to an embodiment of the present invention can include a set of instructions that, when executed by the computer, cause the computer to perform the following operations: sensing meter usage data from each of a plurality of utility meters positioned remote from each other; collecting utility usage data by each of a plurality of meter data collectors each positioned adjacent at least one of the plurality of utility meters; collecting utility usage data from the plurality of meter data collectors, storing the collected utility usage data for each of the plurality of meter data collectors in a database of utility usage readings defining a consumption file associated with the plurality of meter data collectors and located in memory of a field host data collector; requesting the consumption file from the field host data collector by a host computer; and receiving the consumption file to thereby store and process the collected utility usage data. The instructions can also include those for performing the operation of varying the radio frequency mode between a fixed radio frequency mode and a frequency hopping spread spectrum mode, to enhance mesh communication network performance. This can be accomplished by preferably switching the radio frequency mode of at least a portion of the network back and forth, as necessary, from a fixed frequency mode having a single frequency or band to a frequency hopping spread spectrum mode having a plurality of the preselected frequencies/bands, responsive to detection of network interference.

A computer readable medium according to an embodiment of the present invention can include a set of instructions that, when executed by the computer, cause the computer to perform the following operations: sensing meter usage data from each of a plurality of utility meters positioned remote from each other; collecting utility usage data by each of a plurality of meter data collectors each positioned adjacent at least one of the plurality of utility meters; and storing the collected utility usage data in the memory of each respective meter data collector. The instructions also include those for performing the operations of: determining a strength of a communication signal between a remote host computer positioned remote from the plurality of meter data collectors and each of the plurality of meter data collectors; determining a preferred polling sequence route, responsive to the determined signal strength, to thereby form a preferred communication sequence path; polling each of the plurality of meter data collectors with the preferred polling sequence by the host computer; and transmitting the utility usage data, responsive to the polling by the remote host computer, to the host computer from each of the plurality of meter data collectors along the preferred polling sequence route.

The instructions can also include those for performing the operations of: collecting utility usage data from the plurality of meter data collectors by a field host data collector; storing, preferably in batch format, the collected utility usage data for each of the plurality of meter data collectors in a database of utility usage readings associated with the plurality of meter data collectors to define a consumption file located in memory of the field host data collector; and requesting and receiving the consumption file from the field host data collector, to thereby store and process the collected utility usage data. The instructions can also include those for performing the operations of varying or switching the radio frequency mode between a fixed radio frequency mode and a frequency hopping spread spectrum mode, as necessary to circumvent substantial network interference at least encountered along the preferred polling sequence, responsive to detection of such network interference.

Embodiments of the present invention also include a computer readable medium that is readable by a computer collecting utility usage data from a plurality of utility meters having utility meter sensors in communication with a plurality of communication nodes forming a mesh communication network. For example, a computer readable medium can include a set of instructions that, when executed by the computer, cause the computer to perform the operations of:

polling the plurality of communication nodes in the mesh communication network to determine a strength of communication signal between a host computer and each of a plurality of communication nodes, each of the plurality of communication nodes also attempting to communicate with each other, responsive to the polling, to thereby determine a strength of the communication signals between each one of the plurality of communications nodes and another one of the plurality of communication nodes. The instructions also include those to perform the operations of determining an existence of substantial network interference, and varying or switching the radio frequency mode between a fixed radio frequency mode and a frequency hopping spread spectrum mode, as necessary, responsive to signal strength determination between nodes, to thereby enhance mesh communication network performance. An intermittent signal between adjacent nodes can be readily detected and can indicate substantial network interference which can be circumvented using the frequency hopping spread spectrum operational mode.

A computer readable medium can include a set of instructions that, when executed by a host computer, cause the host computer to perform the operations of: determining a strength of a communication signal between each of a plurality of communication nodes; determining a communication sequence to each of the plurality of communication nodes responsive to the determined strength to define a preferred communication sequence path to each of the plurality of communication nodes from the host computer; and enhancing network performance by varying or switching the radio frequency mode of the network between a fixed radio frequency mode and a frequency hopping spread spectrum mode, as necessary, responsive to detection of substantial network interference along the preferred communication sequence path. The instructions can also include those for performing the operation of updating the preferred communication sequence path to allow the preferred communication sequence path to vary over time, the preferred communication sequence path preferably maximizing a number of communication nodes in the communications path for at least a portion of the mesh communications network and/or minimizing network congestion.

A computer readable medium can include a set of instructions that, when executed by a host computer, cause the host computer to perform the operation of initiating polling of a plurality of communication nodes in the mesh communication network, each of the plurality of communication nodes individually attempted to be polled, to thereby determine a strength of communication signal between the host computer and each of the plurality of communication nodes. The instructions can also include those for performing the operation of attempting, by each of the plurality of communication nodes, to communicate with each other, responsive to initiating polling, to thereby determine a strength of communication signal between one of the plurality of communications nodes and another one of the plurality of communication nodes. The instructions can also include those for performing the operation of determining a communication sequence to each of the plurality of communication nodes, responsive to the determined strength of the communication signal between the host computer and each of the plurality of communication nodes and the determined strength of the communication signal between each one of the plurality of communication nodes and another one of the plurality of communication nodes, to define a preferred communication sequence path from the host computer to each of the plurality of communication nodes. The instructions can also include those for periodically performing the polling and determining operations to update the preferred polling sequence route over time, the preferred communication sequence path preferably maximizing a number of communication nodes in the communications path for at least a portion of the mesh communication network and/or minimizing network congestion.

Advantageously, embodiments of the present invention offer an intelligent, low-cost, wireless automated meter reading solution that supports bi-directional communications and that can benefit a utility by providing cost savings on regular "on-cycle" meter readings, the ability to obtain more easily (instantly) final meter reads for opening/closing accounts, streamlined high bill investigations, the ability to flag potential high consumption before consumers get a high bill, help in pinpointing system losses, and that can detect meter tampering. Additionally, embodiments of the present invention advantageously can provide a customer an increased understanding of its usage patterns, Internet access to real-time billing data, enable more frequent reads with minimal incremental cost, enable custom billing dates and options, such as selectable billing dates or frequencies, support customized rates for large customers, support time dependent billing rates, provide detailed consumption information to customers to provide watchdog services, such as, for example, leakage monitoring and power outage and restoration notification, which are not cost-efficient when using manual reading of the meter.

Embodiments of the present invention can provide to a utility improved cash flow management due to a reduction in bill contests, improved revenue forecasting by tying detailed consumption information to production data and expected billings, enable more sophisticated rates, and reduce billing adjustments; and can provide for data warehousing and data mining, historical patterns and expectations analysis, analysis for new rates structures, and the ability to interface with "back-end" billing and accounting software to provide a gathering, transmission, billing, collection and reporting solution.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

Figure 10:
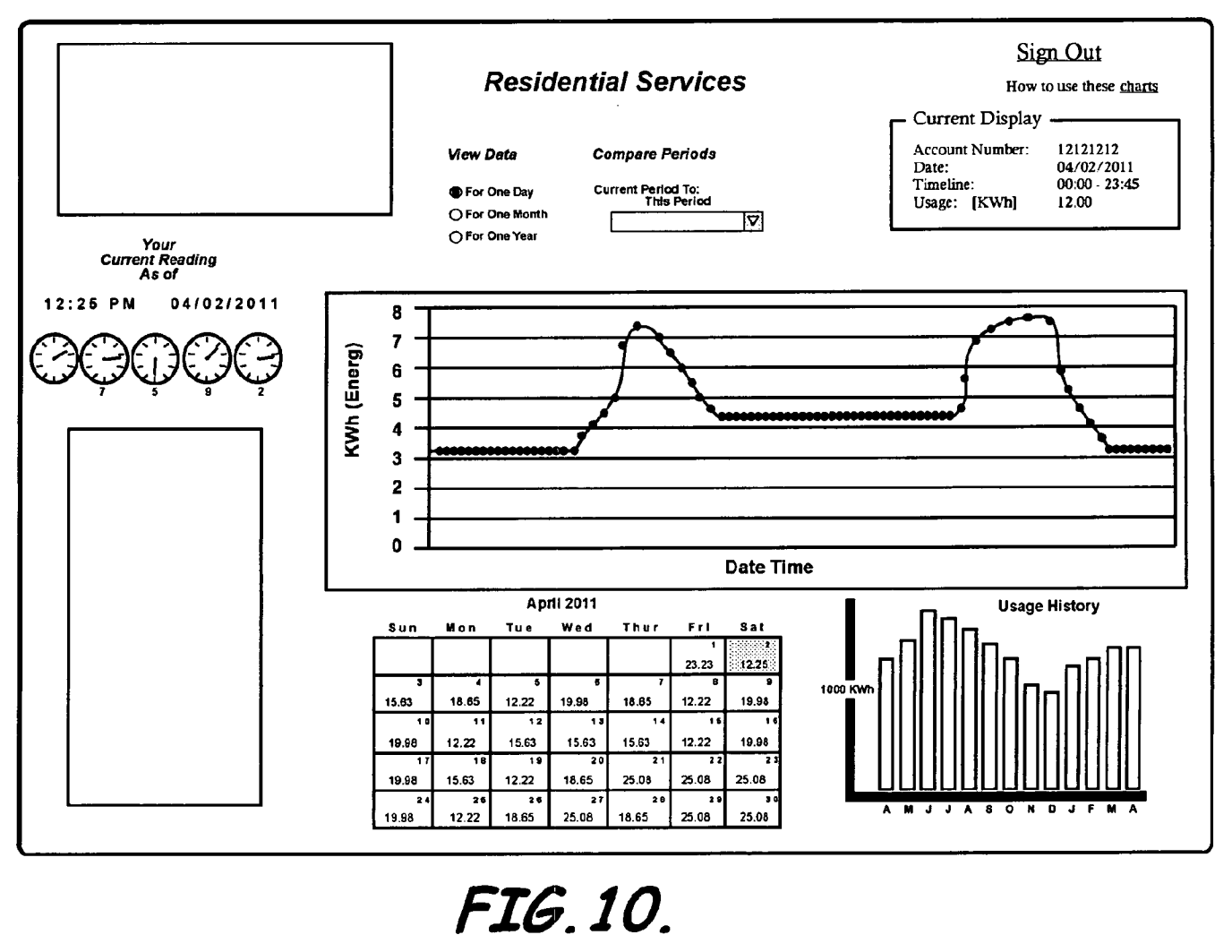

FIG. 10 is a diagram of a customer accessible interactive web page displaying utility usage information according to an embodiment of the present invention.

DETAILED DESCRIPTION

Figure 1:
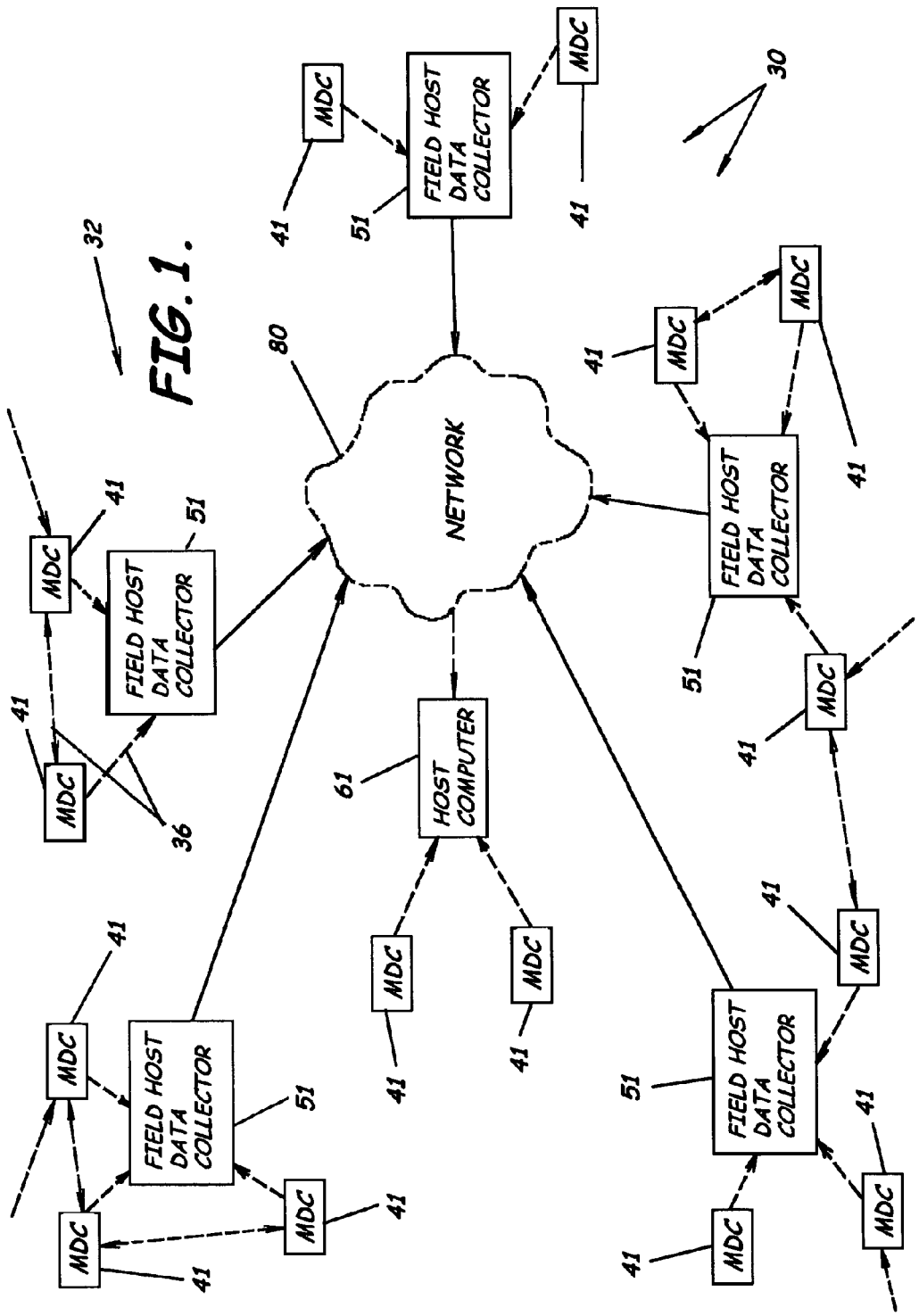
FIG. 1 is a schematic view of an automated meter reading network system according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. The prime notation, if used, indicates similar elements in alternative embodiments.

As illustrated in FIGS. 1-11, embodiments of the present invention incorporate an automated meter reading network system 30 that advantageously provides for both automated data acquisition and energy management. Generally, the automated meter reading network system 30 can support bi-directional communications with a network of meter data collectors 41 with the capability of collecting digital and analog input data, as well as functional control via a digital output board or relay. The meter data collectors 41 can be located at a customer location, such as, for example, mounted to a residence or other building structure 40, and can each be connected to all utility meters at the customer's location. The meter data collectors 41 can monitor utility usage data through, for example, multiple digital or analog inputs and/or multiple encoded inputs; and can transmit that data to a host computer 61, preferably located at a utility's central office 60, via a preferably 902-928 mega-hertz and/or 2.4 gigahertz combination fixed frequency/frequency hopping mesh network 32. The meter data collectors 41 preferably utilize a medium to high range radio frequency (RF) transceiver 44 capable of communications of 1600 meters or approximately one mile with field host data collectors 51, 51' that connect the network 32 to a wireless, cable, fiber, or telephony wide area network 80. The field host data collectors 51, 51', which can be another meter data collector 41, can reside at a municipality infrastructure level such as a sub-station, pump station, or municipal office or other remote center 50. The field host data collectors 51, 51', can collect utility usage data from the surrounding field host data collectors 51, 51', remotely positioned meter data collectors 41, or other intermediate collectors, and can transmit, preferably in batch format, that utility usage data either when requested by the host computer 61 or periodically at a predetermined interval.

Figure 2:
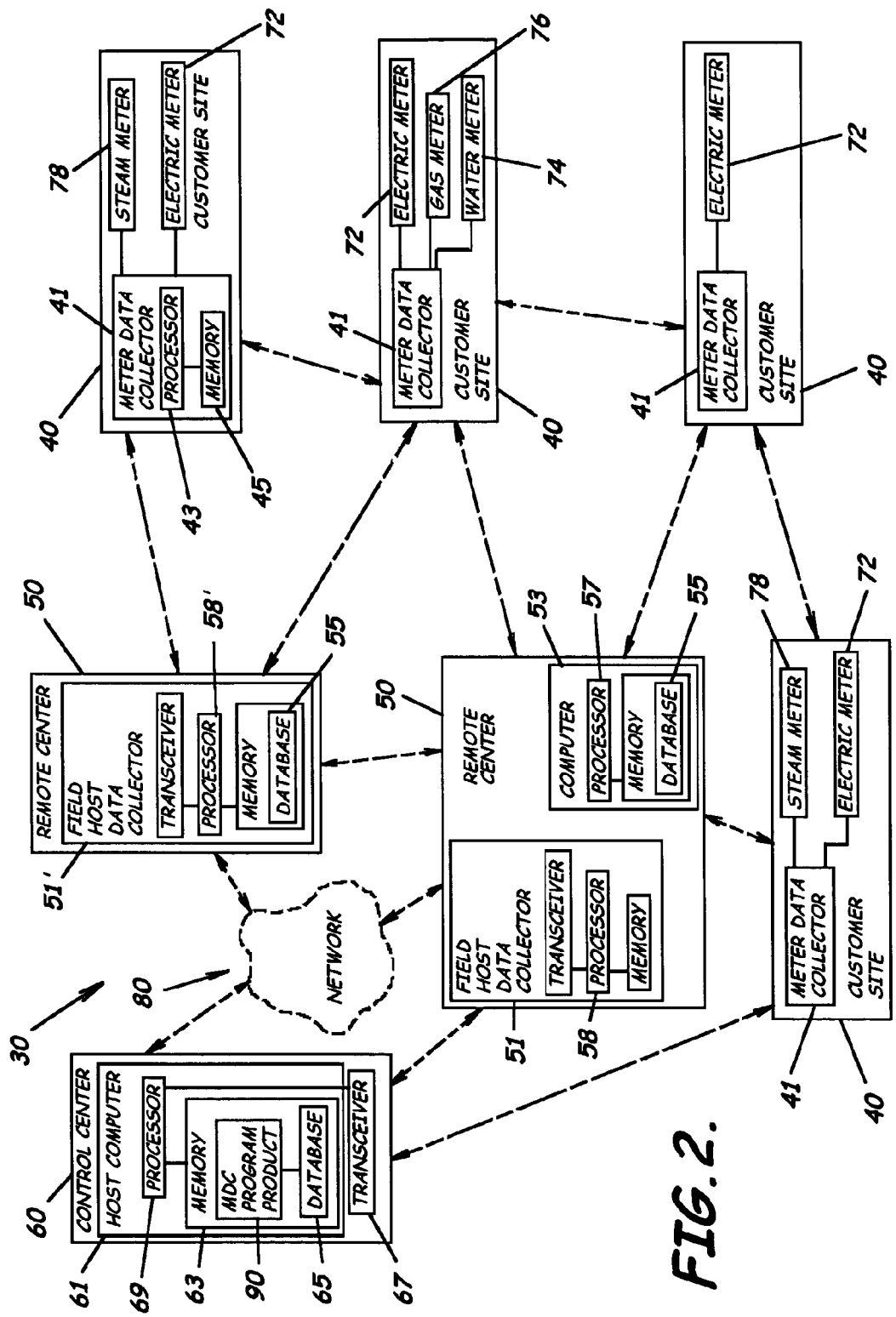
FIG. 2 is schematic view of an automated meter reading network system according to an embodiment of the present invention.
Figure 3:
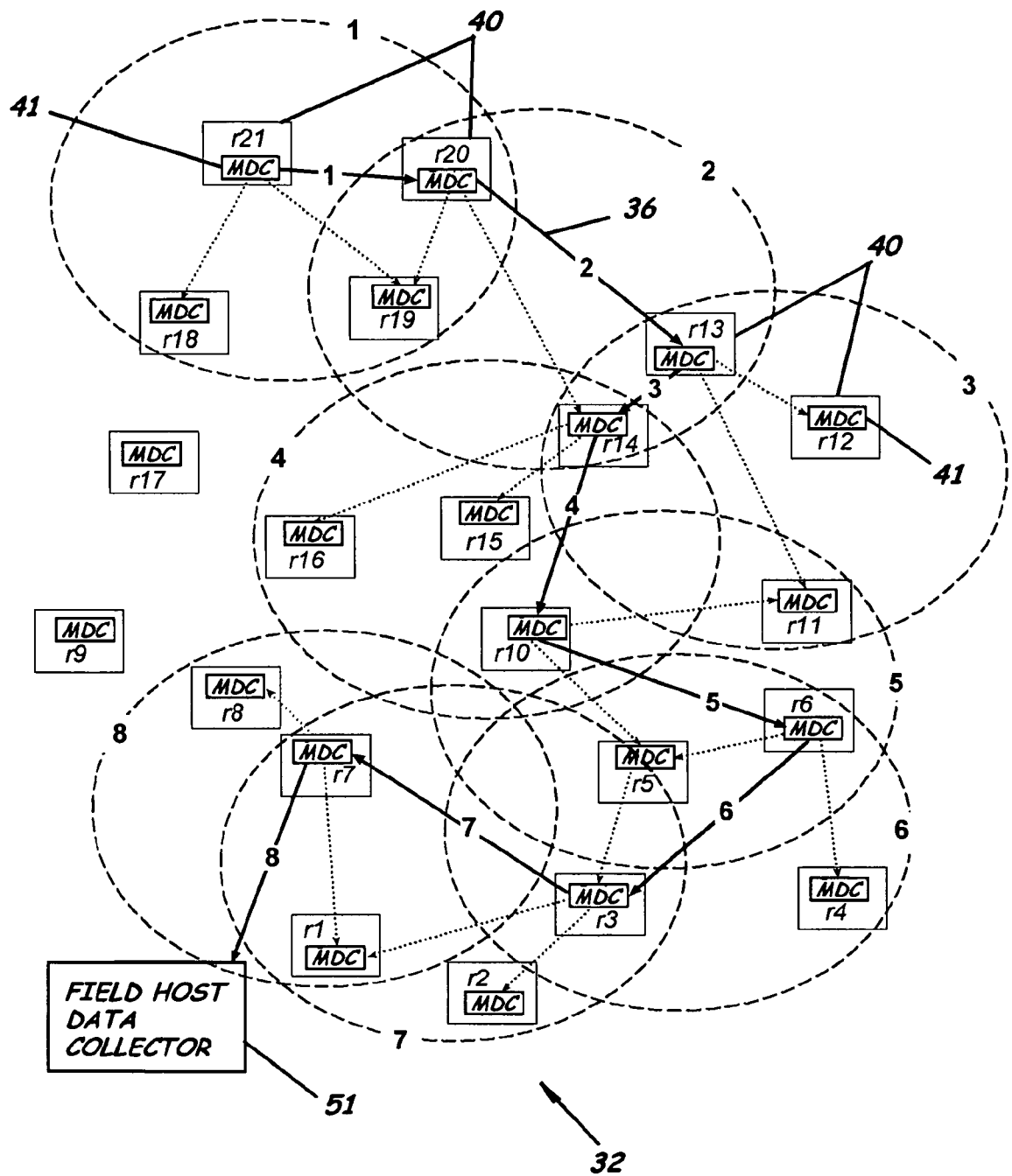
FIG. 3 is a schematic view of an automated meter reading network system according to an embodiment of the present invention.
Figure 4:
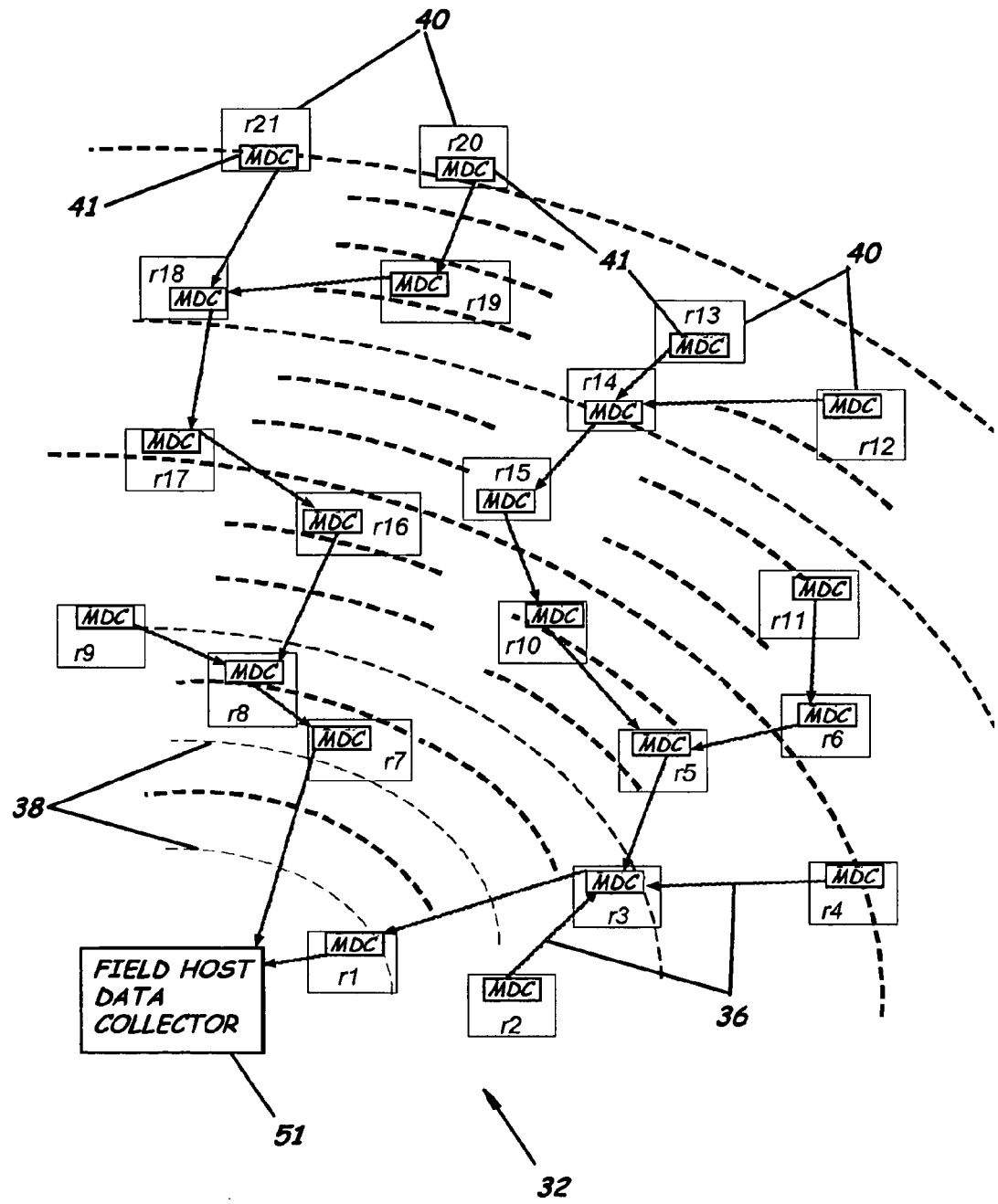
FIG. 4 is a schematic view of an automated meter reading network system according to an embodiment of the present invention.
Figure 5:
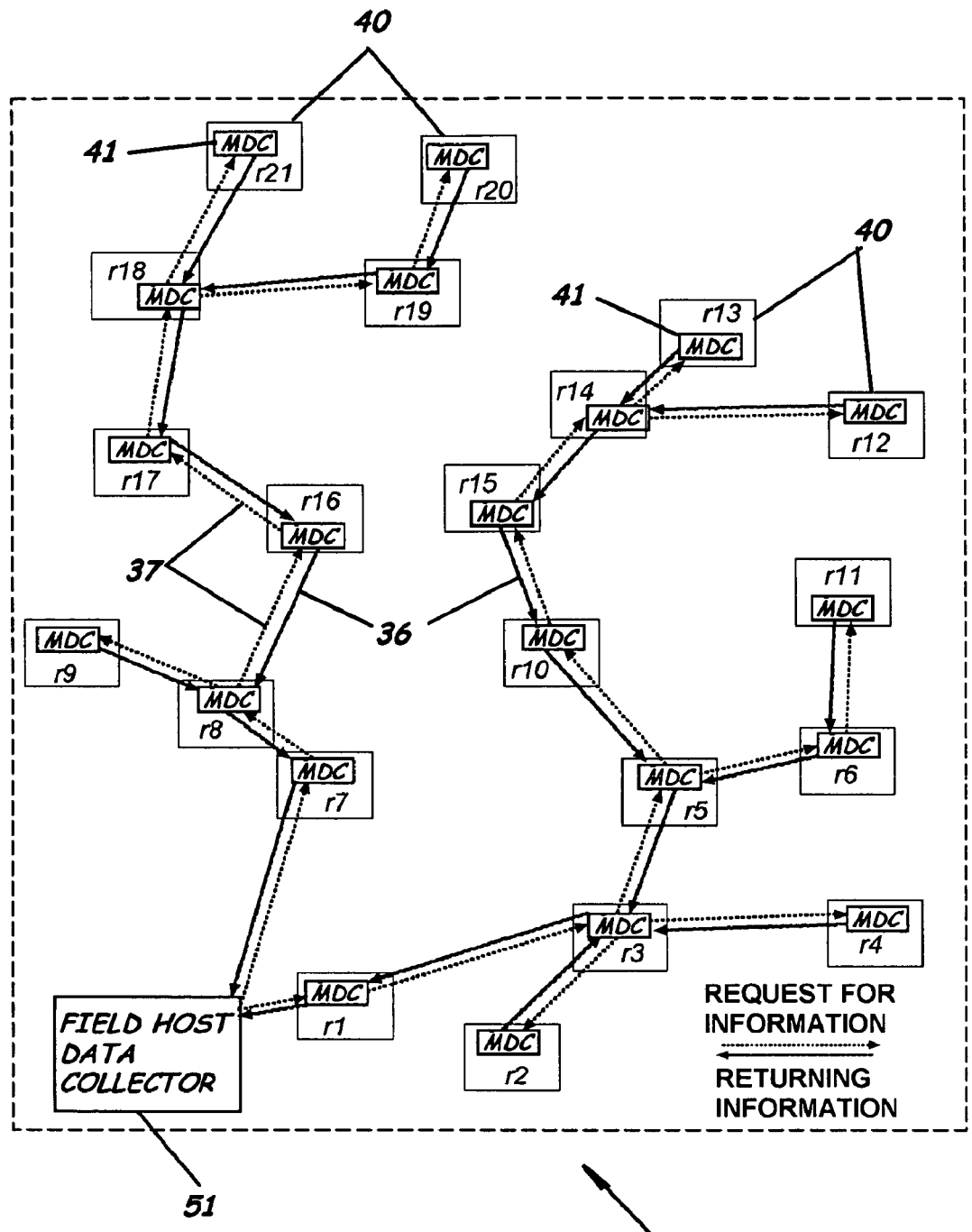
FIG. 5 is a schematic view of an automated meter reading network system according to an embodiment of the present invention.
Figure 9:
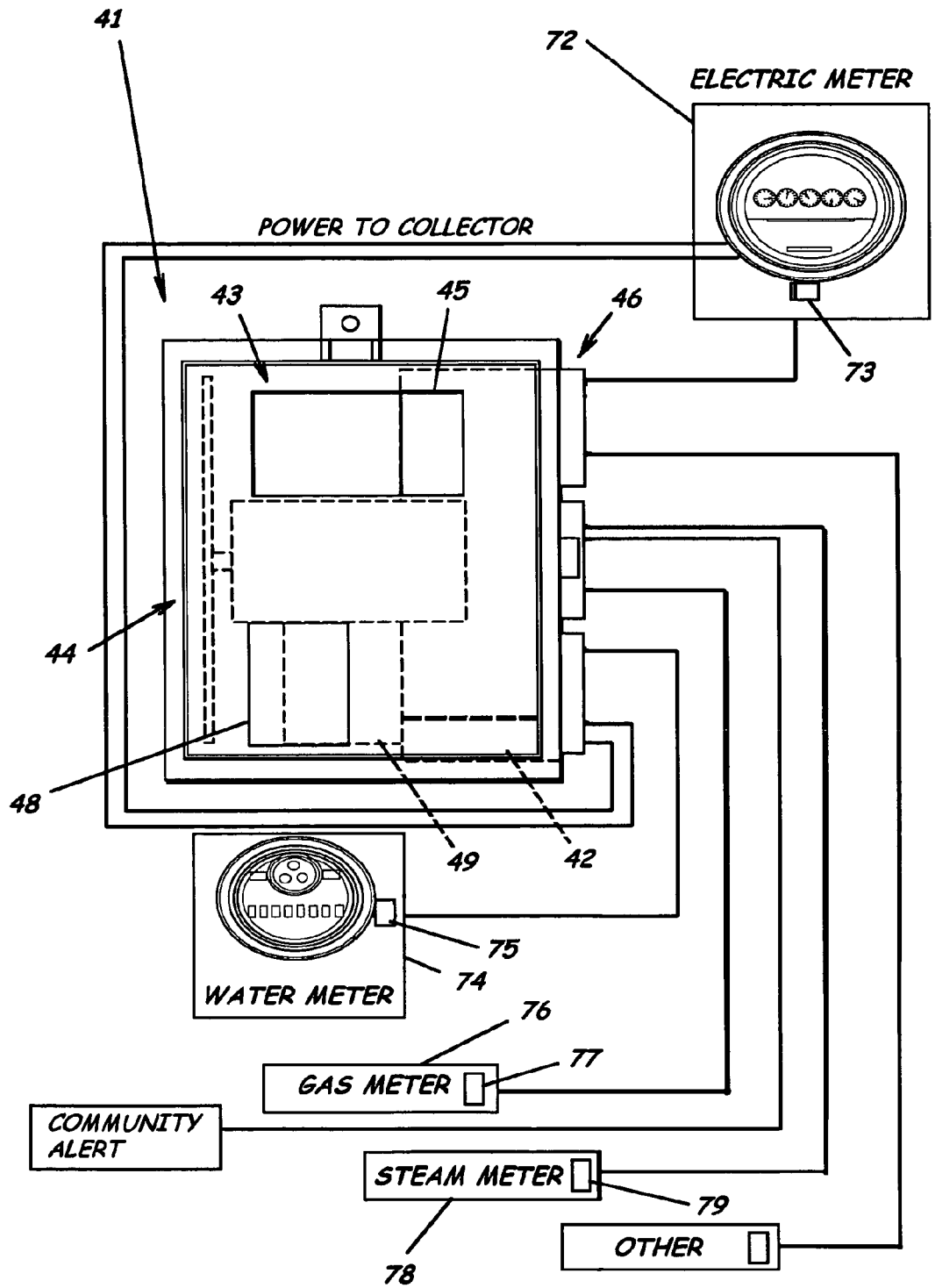
FIG. 9 is schematic view of a meter data collector and having a plurality of data collection ports each for a plurality of different utility meters or other uses according to an embodiment of the present invention.
Figure 11:
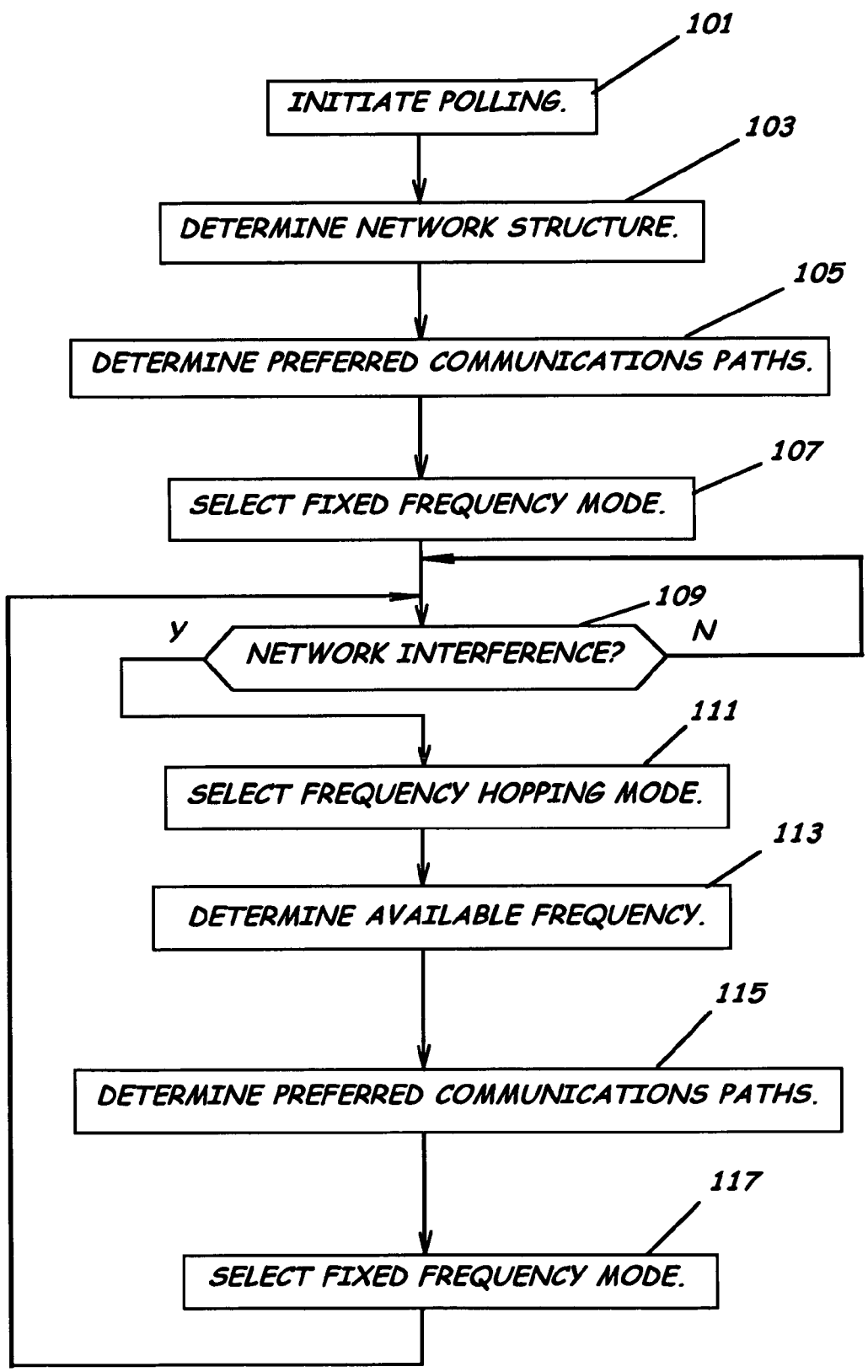
FIG. 11 is a flow diagram of a method of collecting utility meter usage data according to an embodiment of the present invention.

For example, as shown in FIGS. 1, 2, and 9, in an embodiment of the present invention, an automated meter reading network system 30 includes a plurality of utility meters, e.g., electric 72, water 74, gas 76, steam 78, and/or other usage, generally distributed either at a very large customer site or throughout a plurality of smaller customer sites 40. Each of the utility meters 72, 74, 76, 78, is preferably interfaced with and positioned adjacent one or more usage sensors, e.g., sensors 73, 75, 77, 79, which sense utility usage data from the respective utility meters 72, 74, 76, 78. A plurality of multifunction meter data controllers or collectors 41 are each preferably positioned adjacent one or more of the utility meters 72, 74, 76, 78, and are in communication with the respective utility meters 72, 74, 76, 78, through the respective utility usage sensors 73, 75, 77, 79, to collect the utility usage data from each of the plurality of sensors 73, 75, 77, 79. Each meter data collector 41 can include provisions for collecting 20 or more utility usage inputs and can be provided with a digital output board or relay 48 to provide for external device control. Each meter data collector 41 preferably includes a radio frequency telemetry module 44 or other wireless communication means, known to those skilled in the art, to transmit the utility usage data.

Figure 6:
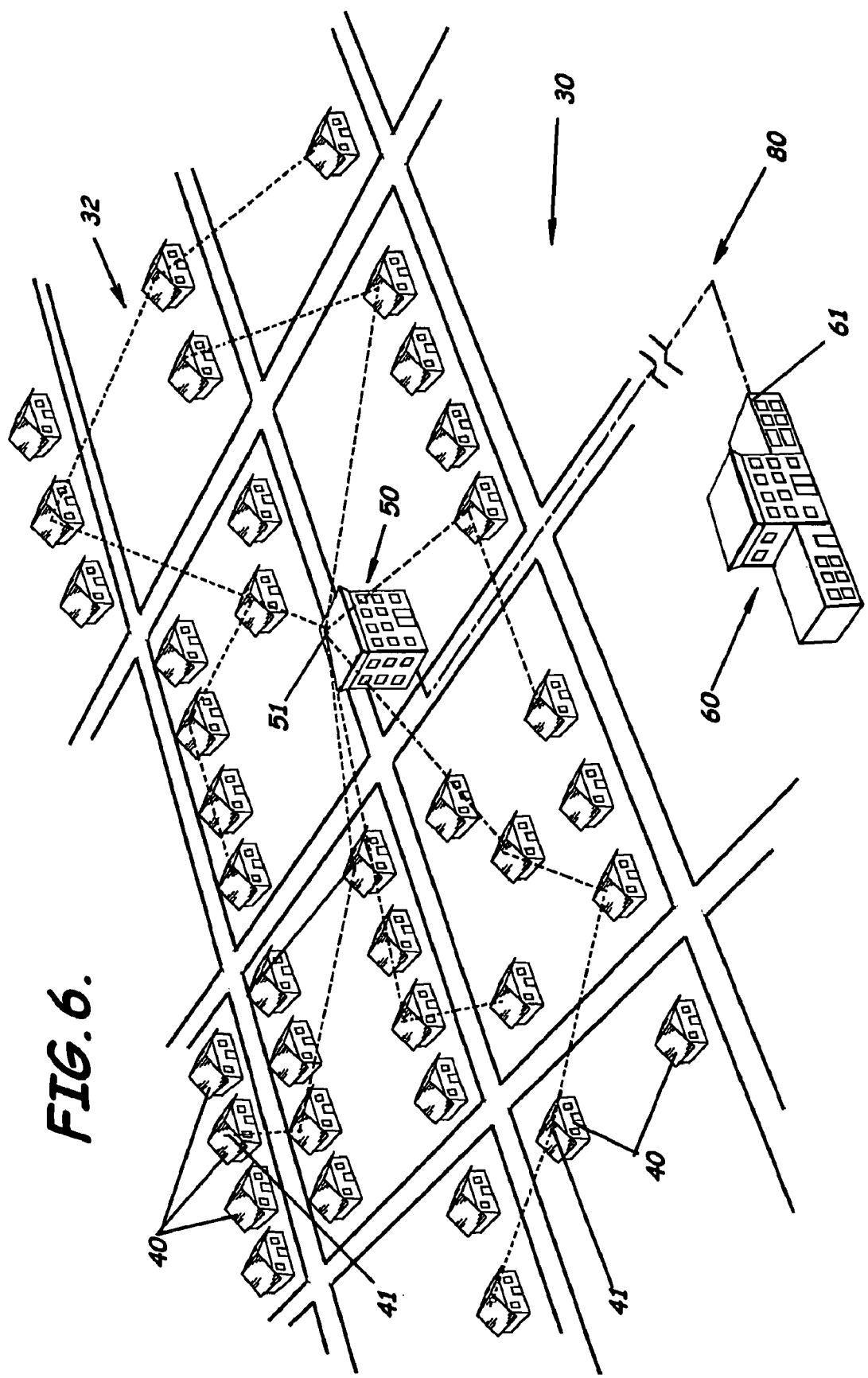
FIG. 6 is an environmental view of a plurality of meter data collectors each positioned on a separate building and in communication with a main utility center according to an embodiment of the present invention.

Each of the plurality of meter data collectors 41 are also preferably positioned spaced apart from and in cross-radio frequency communication with a subset of the plurality of meter data collectors 41, to thereby define a mesh communication network 32 (see, e.g., FIGS. 1 and 6). Through use of the mesh network 32, each of the meter data collectors 41 can both transmit utility usage data for associated utility meters 72, 74, 76, 78, and can transmit (relay) associated utility usage data for other surrounding meter data collectors 41.

As shown in FIG. 9, the multifunction meter data collector 41 includes a power module 42, a controller 43, a telemetry module 44, a memory module 45, a multiple input connection block 46 including a digital and analog inputs, and a housing 47 preferably meeting NEMA standards to enclose the multifunction collector 41. In an embodiment of the present invention, the multiple input connection block 46 advantageously can include input/output modules or ports capable of accepting either digital or analog input including both pulse and encoded readings. An analog input module 49 allows for monitoring of, for example, air-conditioning performance points such as pressure and temperature, providing municipalities the ability to create additional revenue sources. Each meter data collector 41 preferably includes provisions for an RS-232/RS-485 module or suitable substitute which can be used to connect the meter data collector 41 to a high function meter with an RS-232/RS-485 port or any other device that can be controlled via RS 232/RS-485 or a suitable substitute. The power module 42 for each meter data collector 41 can receive electric power from either a monitored electric utility meter 72 or a separate plug-in power supply. When powered by the electric utility meter 72, however, the system 30 can provide tamper detection by detecting loss of power to a respective meter data collector 41.

The sensors 73, 75, 77, 79, generally known to those skilled in the art, are connected to the ports in the connection block 46 and can be tailored to the specific type of utility meter 72, 74, 76, 78, to be read. One sensor type, known as a "dry contact closure," includes an electrical contact or switch when placed in a utility meter activates (opens or closes) at intervals that accurately reflect the energy or usage of the respective utility. The sensor is known as a "dry" contact because the utility meter does not supply any required voltage. That is, the voltage for this type of sensor originates in the meter data collector 41. Another type of sensor, known as a "pulse-type" metering device, generates a voltage pulse at intervals that accurately reflect the energy or utility usage of the respective utility. The voltage for this type of sensor is supplied by the respective utility meter. Still another type of sensor, known as an "encoded-type" metering device, converts energy or utility usage data into a data stream that can be applied to a respective meter data collector 41. The voltage for this type of sensor is supplied by the meter data collector 41. The dry contact closure metering device is most often used with gas and steam meters 76, 78. The pulse-type metering device is most often used with electrical meters 72 and some types of water meters 74. The encoded-type metering device is most often used on some types of water meters 74.

In the preferred embodiment of the present invention, one or more of the sensors 73, 75, 77, 79, are connected directly to the ports of multiple input connection block 46 using electrical conductors. According to alternative embodiments, one or more of the sensors 73, 75, 77, 79, can be connected using fiber optics, acoustics, wireless communication, or other methodologies known to those skilled in the art. The system 30 utilizing the meter data collectors 41 can allow for additional expansion of input/output as needed, including remote disconnect, appliance control for load curtailment, or outage detection, along with consumer value functions such as security, detection, or alarm notification. Electrical outage detection can be provided either through detecting a loss of electric power to a respective meter data collector 41 or detecting no electric utility usage for one or more utility meter data intervals. Advantageously, this provides electric utility managers near real-time customer outage data and negates customer outage reporting requirements. Correspondingly, leakage detection for a continuous leak of either gas or water can be indicated by detection of gas or water flow in approximately 100% of sampled utility meter data intervals. An intermittent leak can be determined by detecting an overly high percentage of sampled utility data intervals indicating usage. For example, an intermittent water leak can be indicated by water flow in, e.g., 48 of 96 utility data intervals.

As perhaps best shown in FIGS. 1 and 2, the system 30 also includes a host computer 61 preferably positioned at a utility control center 60, remote from and in communication with the plurality of meter data collectors 41 through at least a subset of the plurality of meter data collectors 41, to receive the utility usage data for the plurality of meter data collectors 41. The host computer 61 has a memory 63 including or otherwise interfaced with a database 65 to store and process the utility usage data. The system 30 can also include one or more remote centers or substations 50 strategically located throughout the mesh communications network 32 and which can include a field host data collector 51 or alternatively field host data collector 51', for gathering and/or processing the usage reading data. The field host data collectors 51, 51', can be strategically positioned throughout a utility's coverage area and connected preferably to a fiber optic or other network infrastructure 80 to thereby establish communications between the host computer 61 and all available meter data collectors 41. The field host data collectors 51, 51' can request and store the utility usage data and can pass the instructions from the host computer 61 to the meter data collectors 41.

The field host data collectors can have either pass-through or intelligent configurations. The pass-through field host data collectors 51 can provide direct contact between surrounding meter data collectors 41 and the host computer 61 or an intermediate computer associated with the pass-through field host data collector 51, such as, for example, a remote center or substation computer 53 that is in communication with the host computer 61 through the area network 80. Intelligent field host data collectors 51' can collect meter data from surrounding meter data collectors 41 and/or other host field data collectors 51, 51', and transmit the data to the host computer 61 either automatically or when requested to do so by the host computer 61.

The system 30 further includes a meter data collector program product 90 at least partially stored in the memory 63 of the host computer 61. The meter data collector program product 90 can be in the form of microcode, programs, routines, and symbolic languages that provide a specific set or sets of ordered operations that control the functioning of the hardware and direct its operation, as known and understood by those skilled in the art. The meter data collector program product 90 includes a set of instructions particularly adapted to perform the operations of managing the mesh communication network 32 and varying the radio frequency mode of at least portions of the mesh communication network 32 between a fixed frequency and a varying frequency mode when encountering network interference or disruption, to thereby enhance mesh communication network performance. In the preferred embodiment of the present invention, the system 30 uses a combination of fixed radio frequency (RF) and a plurality of different preselected frequencies that continuously change to define frequency hopping radio frequency communication. Alternatively, the system 30 can divide each "piece" of utility usage data across at least a portion of a preselected frequency spectrum to define direct sequence spread spectrum communication.

Most noise that is encountered is due to other conflicting devices operating on a generally narrow but overlapping frequency band. Advantageously, the system 30 is provided a broad frequency spectrum to choose from in order to circumnavigate any encountered significant network interference or disruption. More particularly, the combination of providing both fixed and frequency hopping methodologies allows the system 30 to advantageously reap the benefits of having a fixed frequency communication network when the selected fixed frequency is not encountering significant interference or disruption, e.g., having the ability to broadcast using a fixed frequency; and allows the system 30 or at least portions thereof to begin frequency hopping to various different preselected frequencies in order to overcome frequency interference or disruption. Advantageously, the system 30 can revert back to fixed frequency mode at either the original frequency, once the interference or disruption has ended, or change to a different frequency not affected by the interference or disruption. In another embodiment of the present invention, at least some of the meter data collectors 41 and/or field host data collectors 51, 51', when in frequency hopping spread spectrum mode can simultaneously monitor a preselected fixed or minimally varying frequency to allow for immediate message broadcast.

According to the preferred mesh network configuration, the mesh communications network 32 is entirely RF based because an RF based network reduces data transmission cost, is flexible, and has low deployment costs. The configuration of the mesh communications network 32 can be in the form of a point-to-multipoint network that can utilize, but that is not limited to utilizing, a frequency spectrum in a range acceptable to the Federal Communications Commission (FCC) such as 850-1000 mega-hertz (MHz), preferably 902-928 MHz, and/or 2.4-5.8 giga-hertz (GHz), preferably 2.4 GHz, which are characterized by having minimal regulatory and/or licensing requirements. In an embodiment of the present invention, the system 30 can use low-power RF transmissions. In a medium-range embodiment, the range between collectors 41 and the control center 60 or associated substations can be between 500-1500 meters from the meter data collectors 41. In a long-range embodiment, that distance can be between 2000-6000 meters.

In an embodiment of the present invention, the meter data collectors 41 are powered through a conductor connected to or interfaced with the electric utility meter 72. The conductor is preferably an 18 gauge 4-wire cable, but can have different specifications known to those skilled in the art depending upon the power rating of the meter data collector 41. In another embodiment of the present invention, the meter data collectors 41 are connected to a conductor or cable having an electrical outlet interface (not shown) which can be plugged into a standard customer site electrical outlet. Alternative embodiments for powering the meter data collectors 41 include use of batteries, solar power, wind power, and other methodologies known to those skilled in the art.

As shown in FIG. 9, functionally, data is acquired from the sensor 73, 75, 77, 79, interfaced with its respective individual utility meter 72, 74, 76, 78. The utility usage data is obtained by the meter data collector 41, from the meter sensor 73, 75, 77, 79, and preferably temporarily stored in the memory module 45 of the respective meter data collector 41. The utility usage data can be date and time stamped to provide an accurate record of the utility meter read. The utility meter data can be continuously transmitted ad-hoc, stored for simultaneous transmission, and/or concentrated in batch-file format for transmission by a remote center or substation computer 53 or by an intelligent field host data collector 51'. This allows for data transfer over varying types of network configurations between the host computer 61 and field host data collectors 51, 51', and/or meter data collectors 41, including transfer over the pre-existing public telephone networks (see FIG. 7). The utility usage data received by the host computer 61 can be stored in the database 65 and can be converted into a third-party-compatible database format, such as, for example, OLE DB compatible database file formats or other formats known to those skilled in the art, for input into existing customer information and billing systems (see also FIG. 10).

As perhaps best shown in FIGS. 2 and 6, typically and functionally, if within range and not blocked or impeded by a physical structure or other obstacles, the utility usage data is forwarded directly to the host computer 61 which can be interfaced with a transceiver 67 (see FIG. 2) typically located in a utility control center 60, or indirectly forwarded through a field host data collector 51, 51', typically located in a remote center or a substation 50 or through a meter data collector 41 interfaced directly with the host computer 61. If the meter data collector 41 is not within range, the utility usage data is forwarded to another meter data collector 41 associated with a location preferably closer to the host computer 61 or the field host data collector 51, 51', or to an intermediate collector 34 (FIG. 7) or 35 (FIG. 8) to be forwarded either to the host computer 61, to the field host data collector 51, 51', or to another meter data collector 41. In essence, the network structure can turn every collector 34, 35, 41, 51, 51', into an individual network node capable of transmitting its respective utility usage data and relaying or repeating utility usage data from other "nodes."

Figure 7:
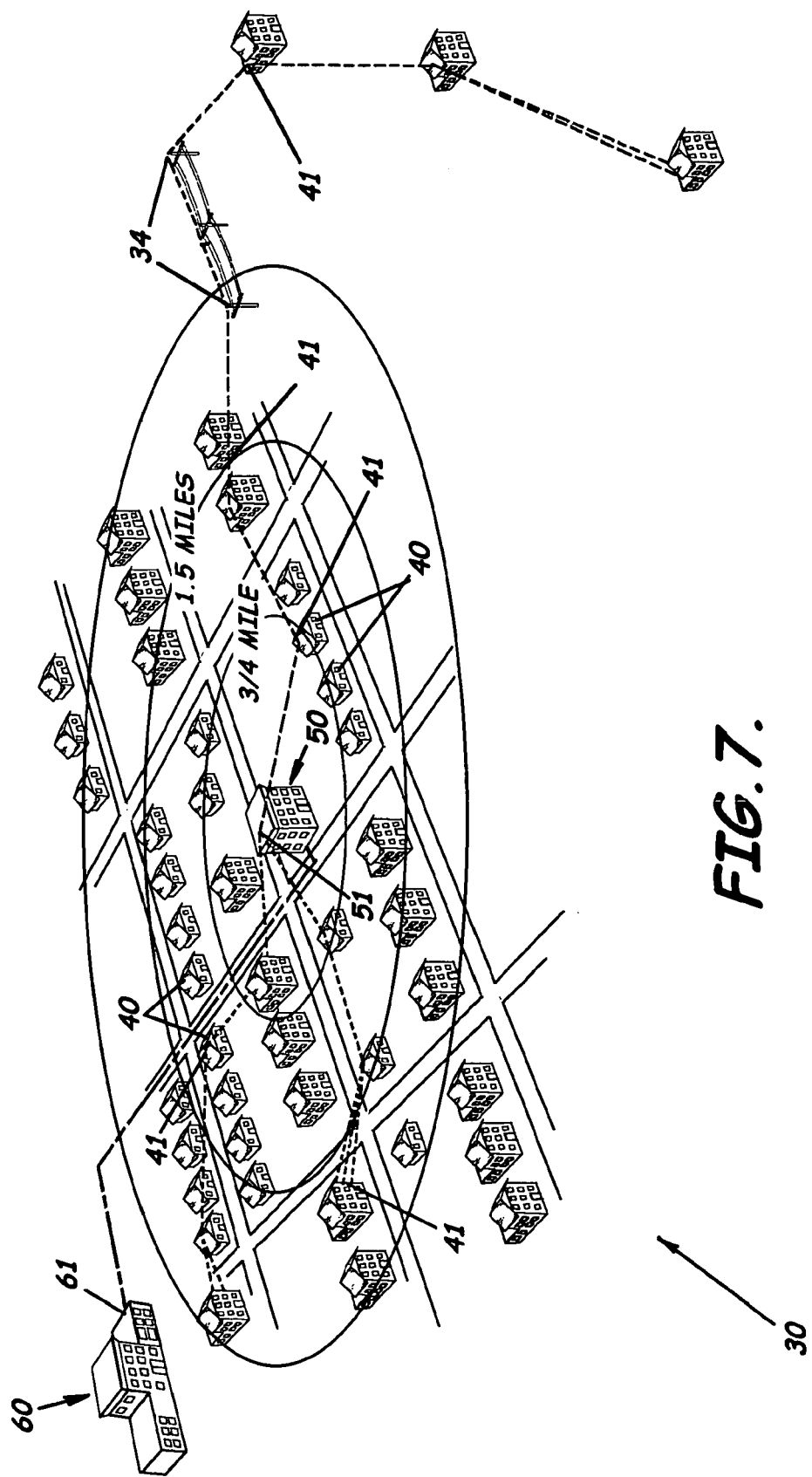
FIG. 7 is an environmental view of a plurality of meter data collectors each positioned on a separate building and in communication with a utility control center according to an embodiment of the present invention.
Figure 8:
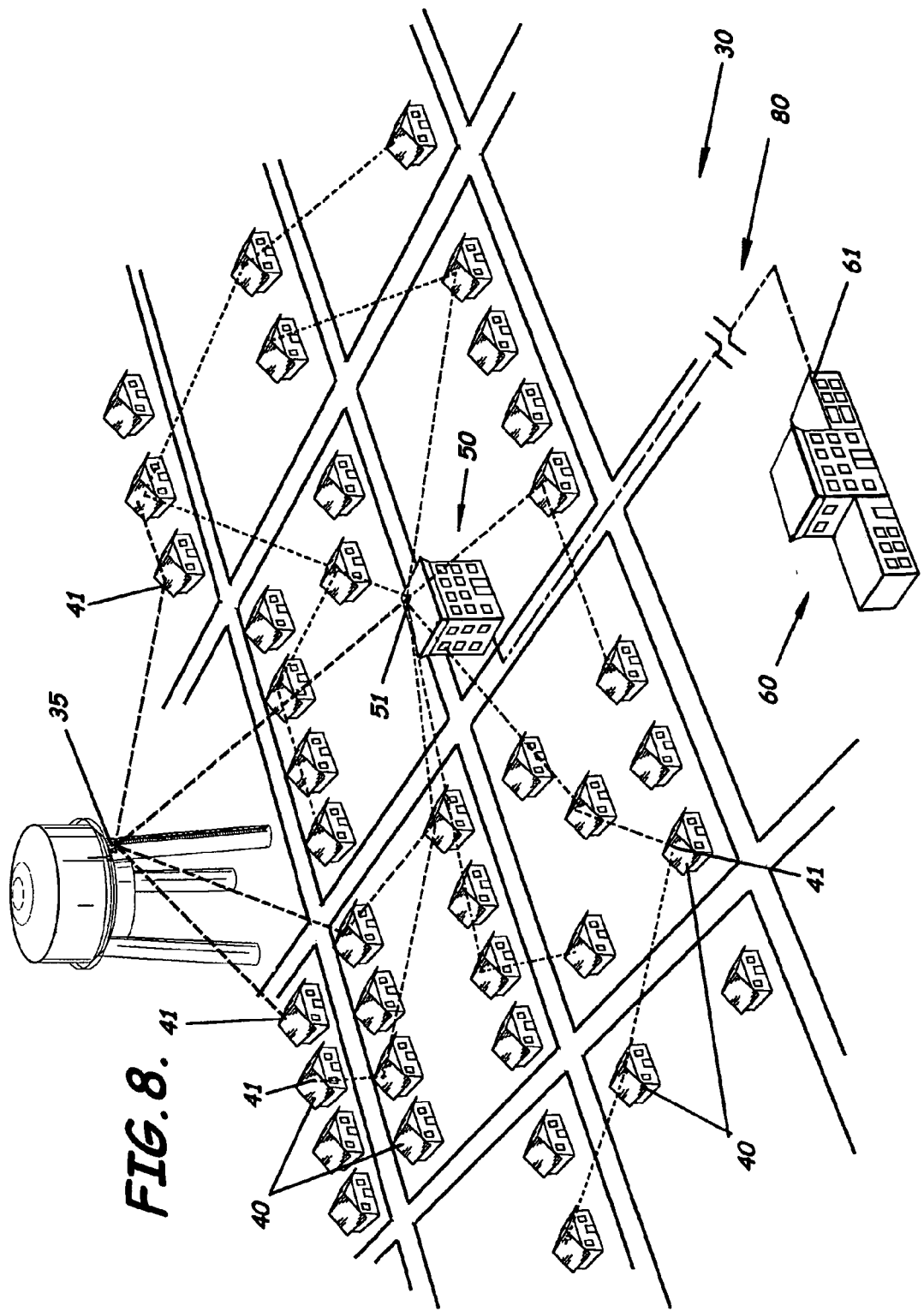
FIG. 8 is an environmental view of a plurality of meter data collectors each positioned on a separate building and in communication with a water tower having a meter data collector or repeater mounted thereto and in communication with a utility control center according to an embodiment of the present invention.

As shown in FIG. 7, in an embodiment of the present invention, the mesh network 32 can be divided into a plurality of radially expanding network levels whereby meter data collectors 41 at a first network level communicate with meter data collectors 41 at a second network level, and so on, through each network level. In an embodiment of the present invention, this can be accomplished while generally not communicating with meter data collectors 41 within the same network level, thereby reducing network congestion.

As shown in FIGS. 1-8, embodiments of the present invention provide a self-healing network having minimal infrastructure that alleviates a line-of-site issue whereby a physical structure may block the transmission of an individual data collector 41, 51, 51'. Embodiments of the present invention also allow for scalability as the addition of a new meter data collector 41 or field host data collector 51, 51', at a new location is merely tantamount to adding an additional "node" to the mesh communications network 32. Note, the network node level between the various nodes and either the host computer transceiver 67 or the field host data collector 51, 51', should normally be limited to a preselected number, such as, for example, 15.

The system 30 provides for both passive and dynamic execution of a "meter read." In an embodiment of the present invention, the meter data collectors 41 send a current read to the control center 60 every 15 minutes, although the control center can prompt for an additional read if greater than 15 minutes delay accuracy is required. For example, upon startup and periodically throughout operation, the meter data collector program product 90 is preferably capable of querying at least one but preferably a plurality of meter data collectors 41 and assigning the meter data collectors 41 a location based on the actual physical location with reference to the other collectors 41 or "nodes" within the mesh communication network 32. According to embodiments of the present invention, the meter data collectors 41 gather a utility usage reading (data) from the at least one associated sensor 73, 75, 77, 79, and transmit the usage data to and can receive instructions from the one or more remote centers or substations 50 or the utility control center 60.

The system or utility control center 60 further includes at least one computer, such as, for example, the host computer 61, which can be a single computer or a system of computers or servers. The host computer 61 includes at least one processor 69 to store, process, and manipulate data gathered by the meter data collectors 41. The host computer 61 also can provide utility usage data to the various functions of the utility's control center 60. For a billing office, for example, accurate timely data insures efficient monthly consumption billing on a customer-requested date. For a customer service department, for example, the collection of daily metering data enables the utility to efficiently manage final reads and switching as well as customer complaints without the expense of dispatching someone to the field to re-read the meter. For a scheduling department, daily reads on all the meters in the service territory significantly improves load-forecasting accuracy. For a loss management department, the collection of tamper status information on a daily basis enables quick identification and resolution of energy theft. For a marketing department, for example, daily reads allow targeting and delivery of new rates or selectable billing dates to specific customers. Daily reads on a customer that has multiple meters in multiple locations also enables delivery of aggregated billing service, or same-day billing services for all its locations. For an engineering/distribution planning department, daily data collection provides an accurate, continually updated picture of daily load that can be isolated to a specific area, enabling optimum efficiency and system planning, outage management, equipment installation, and maintenance. Additionally, frequent data collection of actual usage can be compared to an estimated usage, which enables quick and efficient reconciliation and settlements between utilities, generators, energy service providers (ESPs), and power exchanges. For an end customer, access to daily usage information increases customer satisfaction by enabling more efficient management of energy usage and predicting energy expenditures more accurately.

A data storage medium such as, for example, memory 63, associated with the host computer 61, provides for utility meter record storage and retrieval. The data storage medium is preferably adapted to interface with software for storing and updating the database 65 with utility usage data. The utility usage data can be compared to a temporal usage rate to formulate and store with the utility usage data a record of consumption totals. The database 65 can also include a table(s) to assign the meter data collectors 41 and/or field host data collectors 51, 51', and intermediate collectors 34 (FIG. 7) or 35 (FIG. 8) at least one collector physical address, and can assign various utility usage data. Upon initialization and periodically thereafter, the meter data collector program product 90, at least partially stored in the memory 63 of the host computer 61, preferably performs the operation of forming a list of all available collectors 34, 35, 41, 51, 51', and performs the operation of developing a network communications map from the list of collectors.

More particularly, after the meter data collectors 41 and/or field host data collectors 51, 51' and the primary host system 30 are in place, the host computer 61, through use of the meter data collector program product 90, can gather a list of available collectors 34, 35, 41, 51, 51', which collectively can be considered to be communications nodes for the mesh communication network 32. This process is dynamic in nature and at its conclusion would have a complete network communications map of a mesh network 32, ready to begin the job of data collection primarily through a communication network 80. As a mesh network 32, each meter data collector 41 generally has multiple communication paths between it and a local field host data collector 51, 51', e.g., supporting up to 15 or more links or levels in a single path. The host computer or computer system 61, preferably located at the central office 60, for example, polls the meter data collectors 41 and/or field host data collectors 51, 51', typically on a revolving schedule 24 hours a day, 7 days a week, 365/366 days a year.

The meter data collectors 41 can collect utility usage data from the various meters, e.g., electric 72, water 74, gas 76, steam 78, or other usage. The field host data collectors 51, 51', can periodically poll the meter data collectors 41 located at the various customer locations, e.g., approximately every 15 minutes, and can receive a packet of information that includes meter identification data, consumption data, date and time stamp data, network statistics data, and other data, as desired. The intelligent field host data collectors 51' can maintain a consumption file or database 55 (see FIG. 2) of all collected data received from each meter data collector 41 in its range. Alternatively, a remote center or substation computer 53 can perform this function. The consumption/ utility usage data can be displayed real-time at the utility control center 60 and/or at the remote center or substation 50.

In this configuration, the host computer or system 61 establishes a connection with each field host data collector 51', downloads and processes the consumption file 55, and makes the utility usage data ready for billing, as understood by those skilled in the art. The telemetry module of the meter data collectors 41, intermediate collectors 34, 35, field host data collectors 51, 51', and/or host computer 61 can include a medium to high range RF radio as understood by those skilled in the art, having a power rating preferably in a range of about 1 watt or greater. The telemetry module of the field host data collectors 51, 51', can establish wireless communications 38 (see FIG. 4) to far reaching meter data collectors 41 and rake data back, or can establish communications with the various meter data collectors 41 through communication links 36, 37, (see FIG. 5) and also rake data back, as desired.

According to the preferred embodiment of the present invention, the wireless communications 38 provide for broadcast to available meter data collectors 41 when at least a portion of the mesh communications network 32 is functioning in a fixed frequency mode. The wireless communications 36 and 37 are more ideally suited for when at least portions of the mesh communication network 32 is functioning in a frequency hopping mode or when the various meter data collectors 41 are outside broadcast range. The mesh communications network 32 will either remain in or return to a fixed frequency communications mode when not encountering significant network interference or disruption or when, through frequency hopping, the mesh communications network 32 can determine an available frequency or frequency band to allow reversion to a fixed frequency communication mode, at the available frequency or frequency band.

The host computer 61 utilizing the meter data collector program product 90 can initiate polling of the meter data collectors 41 and the field host data collectors 51' through the frequency hopping within the communications network 32 when in the frequency hopping mode. Each collector can respond to the polling by the host computer 61 through the frequency hopping within the communications network 32. The meter data collector program product 90 can include instructions to perform the operations of initiating the polling whereby each of the meter data collectors 41 is individually attempted to be polled by the host computer 61 to determine a strength of communication signal between the meter data collectors 41 and either the host computer 61 or field host data collectors 51, 51', and between each other of the meter data collectors 41. The meter data collector program product 90 can also include instructions to perform the operations of determining at least one but preferably a plurality of communication sequences to each of meter data collectors 41, in response to the determination of the strength of communication signal between the host computer 61 and surrounding meter data collectors 41, field host data collectors 51, 51', and surrounding meter data collectors 41, and each of the meter data collector 41 and surrounding meter data collectors 41. The preferred communication path along with alternative paths are normally updated over time to reflect various network interferences or disruptions.

The meter data collector program product 90 also includes instructions to perform the operations of collecting the utility usage data. In an embodiment of the present invention, in response to the polling received from the host computer 61, the meter data collectors 41 that are closer to either the host transceiver 67 or field data collectors 51, 51', rakingly collect data from more distant meter data collectors 41, so that utility usage data is collected from each meter data collector 41 throughout the mesh communications network 32 and routed to the host computer 61. The utility usage data received by the host computer 61 can then be converted into a customer compatible database file format, as understood by those skilled in the art, for input into existing customer information and billing systems. The meter data collector program product 90 or other software or program product can further provide a Web server (not shown) data to populate an interactive customer web page with meter real-time utility usage information including a near real-time current meter reading, utility usage charts, daily, monthly, and yearly historical meter readings and comparisons (see FIG. 10). Advantageously, such data helps reduce billing disputes and customer service overhead costs, and helps improve customer energy management.

In the preferred embodiment of the present invention, the meter data collector program product 90, separate network software, or combination thereof, can utilize a preselected network protocol which provides for communication over different types of buses or networks, such as that described in co-pending U.S. patent application Ser. No. 10/779,429 by Boaz titled "Automated Meter Reading System, Communication and Control Network for Automated Meter Reading, Meter Data Collector, and Associated Methods," incorporated herein by reference in its entirety. This protocol can also allow the various collectors 34, 35, 41, 51, 51', to communicate with each other and the host computer/server 61 or substation computer 53. Note, see also U.S. patent application Ser. No. 10/779,429 for a discussion of a methodology of performing frequency hopping in the 902-928 MHz frequency band.

As understood by those skilled in the art, the host computer 61, through meter data collector program product 90, can initiate communication messages to each of the plurality of destination meter data collectors 41. A destination meter data collector 41, for example, can be: directly connected to the host computer 61; connected via radio frequency communications to another meter data collector 41 that is directly connected to the host computer 61; connected via radio frequency for up to a preselected number, e.g., 15, radio frequency repeater meter data collectors 34, 35, 41, to the meter data collector 41 directly connected to the host computer 61; connected via radio frequency communications to a field host data collector 51, 51'; connected via radio frequency communications to an intermediate collector 34 (FIG. 7) or 35 (FIG. 8) in radio frequency communication with another data collector 41, 51, 51'; and connected via various other combinations, thereof. Advantageously, each collector in the mesh communications network 32 can use the same bi-directional transceivers or other transceivers, as understood by those skilled in the art, and can be configured such that the collector receiver input bandwidth matches the hopping channel bandwidth of a corresponding collector transmitter.

The communications portion of a message protocol packet can include a routing source identification number, routing source radio frequency index, routing destination identification number, routing destination radio frequency index, routing gateway node count, and up to the preselected number of routing gateway identification numbers and their corresponding radio frequency indices. The communications portion of an acknowledgement packet can include the routing identification number, routing source radio frequency index, routing destination identification number, and routing destination radio frequency index. The routing source identification number identifies the meter data collector 41 transmitting the message. The meter data collector program product 90 can keep an internal database of the meter data collector identification numbers and their active radio frequency indices based upon each successful communication, whether in a fixed frequency mode, frequency hopping mode, or combination thereof.

According to the preferred embodiment of the present invention, on startup/initialization and periodically thereafter, the meter data collector program product 90 assigns the meter data collector radio frequency index to the least significant byte of the unit unique address. The meter data collectors 41 can receive the same frequency indices, non-consecutive identical frequency indices in any given communications path, or combinations thereof. According to an embodiment of the present invention, message validation for the meter data collector 41 can utilize a meter data collector identification number to equal either the routing destination identification number or the first routing gateway identification number. Acknowledgment message validation can use the meter data collector identification number to equal the routing destination identification number. Additional communication packet validation criteria can include message sequence number, message type, and CRC calculations.

Although startup/initialization can be performed utilizing a fixed frequency mode, according to an embodiment of the present invention, startup/initialization begins utilizing the frequency hopping spread spectrum mode. Advantageously, this allows the system 30 to determine or select a potentially available fixed frequency or frequency band for the mesh communications network 32 after locating each node of the mesh communications network 32. The system 30 can then automatically switch to the fixed frequency mode and remain unless or until either directed by a user to again change mode or when encountering significant network interference on the selected frequency or frequency band.

According to an embodiment of the present invention, upon receipt of a valid message, when in frequency hopping mode, the receiving meter data collector 41 increments/alters its radio frequency index and transmits an acknowledge packet to the received packet routing source identification number at the current radio frequency index. If the meter data collector 41 was the intended destination, then after transmitting the acknowledgment packet the meter data collector 41 transmits the response at the incremented/altered radio frequency index. If the meter data collector 41 was an intended receiver, but not the message destination (see, e.g., FIG. 5), after transmitting the acknowledgment packet, the meter data collector 41 forwards the message utilizing the received packet first routing gateway frequency index.

As shown in FIGS. 1-11 and as described above, embodiments of the present invention also include methods of collecting utility usage data. For example, according to an embodiment of the present invention, a method of collecting utility usage data includes: sensing meter usage data from each of a plurality of utility meters, e.g., electric 72, water 74, gas 76, steam 78, or other usage, typically at least partially positioned remote from each other and in communications range with at least one meter data collectors 41; collecting utility usage data from the plurality of utility meters; determining a signal strength between meter data collectors 41 and/or intermediate collectors 34, 35; determining, responsive to the strength of communication signal, a preferred polling sequence route; polling each of the plurality of meter data collectors 41 by a remotely positioned host computer 53, 61, either directly or through field host data collectors 51, 51', to thereby determine a strength of communication signal between the remote host computer 53, 61, and the plurality of meter data collectors 41 positioned adjacent at least one of the plurality of utility meters; and transmitting meter usage data to the host computer 53, 61, from each of the plurality of meter data collectors 41 along the preferred polling sequence route, responsive to the polling by the host computer 51, 61. Further, the steps of polling and determining can be periodically performed to update the preferred polling sequence route over time and preferably form a communication sequence path minimizing network congestion and/or maximizing a number of communication collectors 41 or other nodes in the communication sequence path.

Also, for example, an embodiment of the present invention provides a method of collecting utility usage data from a plurality of utility meters, e.g., electric 72, water 74, gas 76, steam 78, or other usage, having utility meter sensors, e.g., 73, 75, 77, 79, in communication with a plurality of communication nodes, e.g., collectors 41, forming a mesh communication network 32 characterized by having a variable radio frequency mode. The method includes initiating polling of the plurality of communication nodes in the mesh communication network (block 101), each of the plurality of communication nodes individually attempted to be polled, to thereby determine a strength of communication signal between a host computer 61, and each of a plurality of communication nodes. Each of the plurality of communication nodes also attempt to communicate with each other, responsive to initiating polling, to thereby determine a respective strength of communication signal between each other. As described previously, by polling each of the communication nodes, whether in a fixed frequency mode or in a frequency hopping mode, a map of the current network communication structure can be readily formed (block 103).

From the network communication structure and the determined strength of a communication signal between each of the plurality of communication nodes, a communication sequence path or paths can be determined from the host computer 61 to each of the plurality of communication nodes (block 105). If the mesh communications network 32 is not already in a fixed frequency mode, a fixed frequency can be assigned (block 107) to at least portions of the mesh communication network 32 to provide message broadcasting capability across the network 32. This is normally accomplished when not encountering substantial network interference at the assigned or to be assigned fixed frequency. Advantageously, the preferred communication sequence paths can be selected to preferably minimize network congestion and/or maximize the number of communication nodes in the communications path for at least a portion of the mesh indication network 32. The preferred communication sequence paths can be updated periodically to allow the preferred communication sequence path to vary over time. Having established the mesh communications network 32, utility usage data can be readily received by the host computer 61, as described previously, either automatically or through use of selective polling.

Fixed frequency networks are, however, prone to disruption caused by other transmitters, especially when the network utilizes a heavily congested frequency spectrum. Thus, the host computer 61 can detect a disruption in data flow from or to at least some of the nodes, such disruption providing indicia of external network interference (block 109). The disruption normally takes the form of a narrow-band "noise signal." The phrase "noise signal" can be a misnomer in that it is typically data caused by a foreign transmitter. In response to the disruption, the host computer 61 can vary the radio frequency mode of the network between the fixed radio frequency mode and a frequency hopping spread spectrum mode, to enhance mesh communication network performance. Thus, when substantial network interference is encountered, the host computer 61 can select the frequency hopping spread spectrum mode (block 111) to circumvent the network interference.

By monitoring communication status between the communication nodes, while frequency hopping, the host computer 61 can determine that the original fixed frequency is no longer being disrupted or can determine availability of a preferred alternative frequency that is not affected by a narrow-band noise signal or otherwise unusable (block 113). The host computer 61 can also again map the current network communication structure, determine the strength of a communication signal between each of the plurality of communication nodes, determine a preferred communication sequence path from the host computer 61 to each of the plurality of communication nodes; and can again select fixed frequency mode using either the original fixed frequency or a determined alternative frequency.

In another embodiment of the present invention, each communication node periodically returns to monitor a fixed communication frequency to receive broadcasts. Advantageously, this configuration can allow the system 30 to expedite node communication frequency realignment in the event of a catastrophic network failure. In another embodiment of the present invention, each communication node, even when in frequency-hopping mode, monitors a fixed preselected and preferably reserved frequency not normally affected by other foreign transmitters. This provides the system 30 an enhanced ability to broadcast real-time community or emergency messages to the respective utility customers.

It is important to note that while embodiments of the present invention have been described in the context of a fully functional system, those skilled in the art will appreciate that the mechanism of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

As shown in FIGS. 1-11, embodiments of the present invention also include a computer readable medium that is readable by a computer/processor to collect utility usage data. Note, although the following description will utilize the word "computer," in this context, the term computer includes various forms of processors including the processor/controller 57 of field host computers 53, the processor 69 of host computer 61, the processor/controller 58, 58' of the field host data collectors 51, 51', and/or the processor/controller 43 of the meter data collectors 41.

At least portions of the computer readable medium are typically installed in or accessible by the above processors. For example, in an embodiment of the present invention, the computer readable medium includes a set of instructions that, when executed by a computer, cause the computer to perform the operations of: sensing meter usage data from each of a plurality of utility meters, e.g., 72, 74, 76, or 78, at least some of which are positioned remote from each other; and collecting utility usage data by each of a plurality of meter data collectors 41 from adjacent utility meters. The method also includes instructions to perform the operations of: collecting utility usage data from the plurality of meter data collectors 41; and storing the collected utility usage data for each of the plurality of meter data collectors 41 in a database 55 of utility usage readings associated with the plurality of meter data collectors 41 defining a consumption file, the database 55 located in memory associated with either a field host computer 53 or a field host data collector 51'. The instructions also include those for performing the operations of having the field host data collectors 51' and either the host computers 53 or field host data collectors 51 transmit the consumption file to a host computer 61. This can be either accomplished in response to a request for the consumption file from the field host data collectors 51' and either the host computers 53 or field host data collectors 51, or accomplished automatically at pre-selected intervals, to allow the host computer 61 to store and/or process the collected utility usage data.

According to this embodiment of the present invention, the plurality of meter data collectors 41 form a mesh communication network 32 characterized by having a variable radio frequency mode that can switch between a fixed frequency mode and a frequency-hopping spread spectrum mode, to enhance performance of the mesh communication network 32. The fixed radio frequency mode is preferably selected to provide message broadcasting across at least portions of the network 32 when the various communication links between the meter data collectors 41 are not encountering interference or noise to the extent that the network 32 is considered to be encountering substantial network interference. The frequency hopping spread spectrum mode selected can alternatively be either automatically or manually selected to circumvent substantial network interference, when encountered. That is, when other transmitters or devices interfere with communication links within the mesh communication network 32, the frequency hopping spread spectrum mode can be selected to either: allow the affected links and surrounding nodes to begin changing frequencies in a predetermined sequence; or allow the entire network to begin changing frequencies in the predetermined sequence, in order to circumvent the network interference.

The computer readable medium can include instructions to perform the operations of switching the radio frequency mode of at least a portion of the network 32 from a fixed frequency mode having a first frequency to a frequency hopping spread spectrum mode having a plurality of the preselected frequencies, responsive to detection of network interference, such as, for example, from a narrow-band noise signal. The operations also include determining a second frequency not affected by the narrow-band noise signal, responsive to the frequency hopping; and switching the radio frequency mode of the at least a portion of the network 32 from the frequency hopping spread spectrum mode to the fixed frequency mode utilizing the second frequency. The transition between fixed frequency mode and frequency hopping mode can be either automatic, upon detection of significant network interference between at least one pair of communication nodes (data collectors), or can be directed by a user. Note, although in the preferred configuration the meter data collectors 41 receive and transmit on a single frequency (either fixed or frequency hopping), in order to allow only portions of the mesh communication network 32 to enter frequency hopping with remaining portions maintaining a fixed frequency, at least some of the meter data collectors 41 can be provided the functionality to monitor multiple frequencies either simultaneously or through selective receive-frequency tuning/monitoring.

According to another embodiment of the present invention, the computer readable medium includes a set of instructions that, when executed by a computer, cause the computer to perform the operations of: polling the plurality of communication nodes (e.g., data collectors 34, 35, 41, 51, and/or 51') in the mesh communication network 32 to determine the strength of the communication signal between a host computer 61 and each of a plurality of communication nodes. Each of the plurality of communication nodes also attempt to communicate with each other, responsive to the polling, to thereby determine the strength of the communication signals between each communications node and surrounding communication nodes.

The operations performed also include determining an existence of network interference. An intermittent signal or reduced signal strength between a given pair of adjacent communication nodes are typical indicia of such network interference rather than indicia of a permanent line-of-site obstruction or physical structure blocking the transmission the adjacent communication nodes. Network interference is often caused by adjacent foreign transmission devices intermittently utilizing one or more frequencies within the spectrum of frequencies used by the communication nodes. If the interference is not continuous, the utility usage data between nodes can be re-transmitted and should be received. According to an embodiment of the present invention, if the utility usage data is unsuccessfully transmitted after a preselected time period or after a preselected number of attempts, the interference can be circumvented by varying or switching the radio frequency mode between a fixed radio frequency mode and a frequency hopping spread spectrum mode and back, as necessary, as additional network interference is detected or as previously detected interference ends.

According to another embodiment of the present invention, the computer readable medium includes a set of instructions that, when executed by a computer, cause the computer to perform the operations of: sensing meter usage data from each of a plurality of utility meters 41 positioned remote from each other; collecting utility usage data by each of a plurality of meter data collectors 41 positioned adjacent at least one of the plurality of utility meters; and collecting utility usage data from the plurality of meter data collectors 41 for temporary storage in the memory module 45 of each respective meter data collector 41.

The instructions can also include those for performing the operations of: determining communication signal strength between a remote host computer 61, positioned remote from the plurality of meter data collectors 41, and each of the plurality of meter data collectors 41; determining a preferred polling sequence route in response to the determined strength of the communication signals between the remote host computer and each of the plurality of meter data collectors; polling each of the plurality of meter data collectors with the preferred polling sequence by the host computer 61; and transmitting the utility usage data to the host computer 61 from each of the plurality of meter data collectors 41 along the preferred polling sequence route in response to the polling by the remote host computer 61, thereby forming a preferred communication sequence path. The instructions can also further include those to perform the operations of periodically performing the polling and determining steps to update the preferred polling sequence route over time, the preferred communication sequence path preferably minimizing network congestion and/or maximizing a number of meter data collectors 41 in the communications path. Note, maximizing the number of meter data collectors 41 in the communications path can advantageously provide for improved redundancy in the mesh communication network 32.

If the system 30 includes field host data collectors 51, 51', at least a portion of the utility usage data can be transmitted directly to such field host data collectors 51, 51', for either direct forwarding to the host computer 61 or for temporary storage, processing, arid/or for later transmission to the host computer 61. The collected utility usage data can be stored in a database 55 (see FIG. 2) of utility usage readings associated with the plurality of meter data collectors 41 to define a consumption file located in memory associated with the field host data collector 51, 51'. For pass-through field host data collectors 51, this memory can be either internal memory or memory of an associated remote host substation computer 53. For intelligent field host data collectors 51', this memory is normally internal memory but can be memory associated with an external storage device as known by those skilled in the art. In the preferred configuration, in order to enhance data processing and customer billing, the utility usage data is stored in batch format in the consumption file. The instructions include those for performing the operation of the host computer 61 requesting, and the field host data collectors 51, 51', transmitting the consumption file to the host computer 61 over a network 80. Thus computer 61 then stores and processes the collected utility usage data.

As described previously, if the utility usage data is unsuccessfully transmitted either directly to the host computer 61, to the field host data collectors 51, 51', or to an adjacent meter data collector 41, after a preselected time period or after a preselected number of attempts, the computer readable medium includes instructions to perform the operation of circumventing the interference by varying or switching the radio frequency mode of the mesh communication network 32 between a fixed radio frequency mode and a frequency hopping spread spectrum mode and back, as necessary, as additional network interference is detected or as previously detected interference ends.

According to another embodiment of the present invention, the computer readable medium includes a set of instructions that, when executed by the computer, cause the computer to perform the operations of: initiating polling of each of the plurality of communication nodes (e.g., data collectors 34, 35, 41, 51, and/or 51') in the mesh communication network to determine a strength of communication signal between a host computer 61 and each of a plurality of communication nodes. Each of the plurality of communication nodes are individually attempted to be polled and each of the plurality of communication nodes attempt to communicate with each other, responsive to initiating polling, to thereby determine a strength of the communication signals between each communications node and surrounding communication nodes. The computer readable medium also includes instructions for performing the operations of determining a communication sequence to each of the plurality of communication nodes, responsive to the determined strength of the communication signal between the host computer 61 and each of the plurality of communication nodes and the determined strength of the communication signal between each communications node and surrounding communication nodes, to define a preferred communication sequence path to each of the plurality of communication nodes from the host computer 61. Further, the instructions can include those for performing the operations of periodically performing the polling and determining operations to update the preferred polling sequence route over time, the preferred communication sequence path preferably maximizing a number of communication nodes in the communications path for at least a portion of the mesh communication network 32 and/or minimizing network congestion.

In the drawings and specification, there have been disclosed a typical preferred embodiment of the invention, and although specific terms are employed, the terms are used in a descriptive sense only and not for purposes of limitation, the scope of the invention being set forth in the following claims. The invention has been described in considerable detail with specific reference to these illustrated embodiments. It will be apparent, however, that various modifications and changes can be made within the spirit and scope of the invention as described in the foregoing specification. For example, although possibly more costly to implement, rather than switching between a fixed frequency mode and a frequency-hopping spread spectrum mode, the fixed frequency mode can be switched between itself and a direct sequence spread spectrum mode in order to circumvent network interference.

That claimed is:

1. An automated meter reading network system comprising:

a plurality of utility meters each located at a separate customer site;

a plurality of sensors each interfaced with and positioned adjacent a separate one of the plurality of utility meters to thereby sense utility usage data from each of the plurality of utility meters;

a plurality of meter data collectors each positioned adjacent at least one of the plurality of utility meters and in communication with at least one of the plurality of sensors interfaced with the separate one of the plurality of utility meters to collect the utility usage data from each of the plurality of sensors, each of the plurality of meter data collectors including a radio frequency telemetry module to transmit the utility usage data and also positioned in radio frequency communication with at least one other of the plurality of meter data collectors;

a plurality of field host data collectors each positioned spaced apart from the other ones of the plurality of field host data collectors and each in radio frequency communication with a subset of the plurality of meter data collectors to request and collect utility usage data from the plurality of meter data collectors, and each of the plurality of field host data collectors having a memory to store the collected utility usage data, a combination of the plurality of field host data collectors and the plurality of meter data collectors at least partially in cross-radio frequency communication to thereby define a mesh communication network having a radio frequency mode, each of the plurality of field host data collectors and the plurality of meter data collectors defining a communication node in the mesh communication network, each one of the plurality of communication nodes adapted to communicate with other ones of the plurality of communication nodes in the mesh communication network to thereby reduce line-of-site communication problems between each of the plurality of communication nodes;

a host computer positioned remote from the plurality of field host data collectors and the plurality of meter data collectors, in communication with each of the plurality of field host data collectors and each of the plurality of meter data collectors to provide instructions thereto, and in communication with the plurality of field host data collectors to request and receive the utility usage data and having a memory to store and process the collected utility usage data; and meter data collector program product at least partially stored in the memory of the host computer comprising a set of instructions adapted to manage the mesh communication network, and adapted to vary the radio frequency mode between a fixed radio frequency mode and a frequency hopping spread spectrum mode, to thereby enhance mesh communication network performance, the fixed radio frequency mode selected to provide message broadcasting across at least portions of the network when not encountering substantial network interference, the frequency hopping spread spectrum mode selected to circumvent substantial network interference when encountering substantial network interference.

2. An automated meter reading network system as defined in claim 1, wherein the collected utility usage data for each of the plurality of meter data collectors is stored in a database of utility usage readings defining a consumption file, and wherein the utility usage data is stored in the consumption file in batch format by the plurality of field host data collectors to enhance utility usage data processing and customer billing.

3. An automated meter reading network system as defined in claim 1, wherein the meter data collector program product is adapted to detect and recognize utility electric power interruption through at least one of analyzing the utility electric power usage data and detecting an interruption in transmission of electric utility meter usage data, to thereby provide electric utility managers near real-time customer outage data and to thereby negate customer outage reporting requirements.

4. An automated meter reading network system as defined in claim 1, wherein the meter data collector program product is adapted to detect utility water leakage, a continuous leak indicated by detection of water flow in approximately 100% of sampled utility meter data intervals.

5. An automated meter reading network system as defined in claim 1, wherein the meter data collector program product is adapted to populate an interactive customer web page with meter near real-time data, responsive to receipt by the host computer of respective near real-time customer usage data, the customer web page providing the customer near real-time feedback on current energy usage and near real-time utility meter-read verification, to thereby reduce billing disputes and customer service overhead costs.

6. An automated meter reading network system as defined in claim 1,
wherein a subset of the plurality of meter data collectors includes an internal power module adapted to connect directly to a tap in associated electric utility meter;
wherein electric power for the subset of the plurality of meter data collectors is obtained by connecting the internal power module to the associated electric utility meter; and
wherein the meter data collector program product provides tamper detection to the subset of the plurality of meter data collectors by detecting loss of power to each respective meter data collector.

7. An automated meter reading network system comprising:

a plurality of sensors each interfaced with and positioned adjacent a separate one of a plurality of utility meters positioned at a customer site to thereby sense utility usage data from each of the plurality of utility meters;

a plurality of meter data collectors each in communication with at least one of the plurality of sensors to collect the utility usage data, each including a radio frequency telemetry module to transmit the utility usage data, and each one of the plurality of meter data collectors positioned spaced apart from and in cross-radio frequency communication with a subset of the other ones of the plurality of meter data collectors to thereby define a mesh communication network having a radio frequency mode;

a host computer positioned remote from and in communication with the plurality of meter data collectors to receive the utility usage data and having a memory to store and process the utility usage data; and meter data collector program product at least partially stored in the memory of the host computer comprising a set of instructions adapted to manage the mesh communication network, and adapted to vary the radio frequency mode of at least portions of the mesh communication network between a fixed radio frequency mode and a frequency hopping spread spectrum mode, to thereby enhance mesh communication network performance, the fixed radio frequency mode selected to provide message broadcasting across at least portions of the network when not encountering substantial network interference, the frequency hopping spread spectrum mode selected to circumvent substantial network interference when encountering substantial network interference.

8. An automated meter reading network system as defined in claim 7, further comprising:
a plurality of field host data collectors each one positioned spaced apart from the other ones of the plurality of field host data collectors and in radio frequency communication with a subset of the plurality of meter data collectors to collect utility usage data from the plurality of meter data collectors, and each one of the plurality of field host data collectors having a memory to store collected utility usage data therein, a combination of the plurality of field host data collectors and the plurality of meter data collectors at least partially in cross-radio frequency communication to thereby further define the mesh communication network and to thereby reduce line-of-site communication problems between each of the plurality of meter data collectors and the host computer.

9. An automated meter reading network system as defined in claim 7, wherein a subset of the plurality of meter data collectors each include an output relay to provide at least one of the following: remote disconnect of an associated utility and utility load curtailment control.

10. An automated meter reading network system as defined in claim 7, wherein a subset of the plurality of meter data collectors each include an output relay to provide at least one of the following: remote disconnect of an associated utility and utility load curtailment control, to thereby enhance customer energy management.

11. An automated meter reading network system as defined in claim 7,
wherein a subset of the plurality of meter data collectors includes an internal power module adapted to connect directly to a tap in an associated electric utility meter;

wherein electric power for the subset of the plurality of meter data collectors is obtained by connecting the internal power module to the associated electric utility meter; and wherein the meter data collector program product provides tamper detection to the subset of the plurality of meter data collectors by detecting loss of power to each respective meter data collector.

12. An automated meter reading network system as defined in claim 7, wherein the meter data collector program product is adapted to detect and recognize utility electric power interruption through at least one of analyzing the utility electric power usage data and detecting an interruption in transmission of electric utility meter usage data, to thereby provide electric utility managers near real-time customer outage data, and to thereby negate customer outage reporting requirements.

13. An automated meter reading network system as defined in claim 7, wherein the meter data collector program product is adapted to detect utility water leakage, a continuous leak indicated by detection of water flow in approximately 100% of sampled utility meter data intervals.

14. An automated meter reading network system as defined in claim 7, wherein the meter data collector program product is adapted to populate an interactive customer web page with meter near real-time data, responsive to receipt by the host computer of respective near real-time customer usage data, the customer web page providing the customer near real-time feedback on current energy usage and near real-time utility meter-read verification, to thereby reduce billing disputes and customer service overhead costs.

15. An automated meter reading network system as defined in claim 8, wherein the collected utility usage data for a subset of the plurality of meter data collectors is stored by at least one of the plurality of field host data collectors in an associated database of utility usage readings defining a consumption file, and wherein the utility usage data is stored in the consumption file in batch format by the at least one of the plurality of field host data collectors to enhance utility usage data processing and customer billing.

16. A computer readable medium that is readable by a computer collecting utility usage data defining a field host data collector, the computer readable medium comprising a set of instructions that, when executed by the field host data collector, cause the field host data collector to perform the following operations:

receiving collected utility usage data from a plurality of meter data collectors each positioned adjacent at least one of a plurality of utility meters, the plurality of meter data collectors forming a mesh communication network having a variable radio frequency mode adapted to vary between a fixed radio frequency mode and a frequency hopping spread spectrum mode;

sending instructions to the plurality of meter data collectors to enter the frequency hopping spread spectrum mode to circumvent substantial network interference in response to encountering substantial network interference;

storing the collected utility usage data for each of the plurality of meter data collectors in a database of utility usage readings defining a consumption file associated with the plurality of meter data collectors and located in memory of the field host data collector; and sending the consumption file from the field host data collector to a host computer to thereby store and process the collected utility usage data.

17. A computer readable medium that is readable by a computer collecting utility usage data, the computer readable medium comprising a set of instructions that, when executed by the computer, cause the computer to perform the following operation:

receiving an indication of interference in a mesh communication network; and sending instructions to a plurality of meter data collectors to vary a radio frequency mode of the mesh communication network between a fixed radio frequency mode and a frequency hopping spread spectrum mode to enhance mesh communication network performance, the instructions to select the frequency hopping spread spectrum mode when substantial network interference is detected, the instructions to select the fixed radio frequency mode to provide message broadcasting across at least portions of the network when no longer encountering substantial network interference.

18. A computer readable medium that is readable by a computer collecting utility usage data, the computer readable medium comprising a set of instructions that, when executed by the computer, cause the computer to perform the following operations:

sending instructions to a plurality of meter data collectors to thereby switch a radio frequency mode of at least a portion of a mesh communication network from a fixed frequency mode having a first frequency to a frequency hopping spread spectrum mode having a plurality of the preselected frequencies in response to detection of network interference from a narrow-band noise signal;

determining a second frequency not affected by the narrow-band noise signal in response to the frequency hopping; and sending instructions to the plurality of meter data collectors to thereby switch the radio frequency mode of the at least a portion of the network from the frequency hopping spread spectrum mode to the fixed frequency mode, the fixed frequency mode utilizing the determined second frequency.

19. A computer readable medium that is readable by a host computer collecting utility usage data from a plurality of utility meters having utility meter sensors in communication with a first plurality of communication nodes forming a mesh communication network having a variable frequency mode, the computer readable medium comprising a set of instructions that, when executed by the host computer, cause the host computer to perform the following operations:

polling the first plurality of communication nodes in the mesh communication network to determine a strength of communication signal between the host computer and each of a second plurality of communication nodes, each of the first plurality of communication nodes also adapted to communicate with each other in response to the polling to thereby determine a strength of the communication signals between each one of the first plurality of communications nodes and another one of the first plurality of communication nodes, each of the first plurality of communication nodes also adapted to transmit utility meter usage data;

determining an existence of substantial network interference indicated by an intermittent signal between adjacent nodes; and sending instructions to the first plurality of communication nodes to vary the radio frequency mode between a fixed radio frequency mode and a frequency hopping spread spectrum mode in response to signal strength determination between nodes to thereby enhance mesh communication network performance, the fixed radio frequency mode selected to provide message broadcasting across at least portions of the network when not encountering substantial network interference, the frequency hopping spread spectrum mode selected to circumvent substantial network interference when encountering substantial network interference.

20. A computer readable medium as defined in claim 19, further comprising a set of instructions that, when executed by the host computer, cause the host computer to perform the following operations:

sending instructions to the first plurality of communication nodes to thereby switch the radio frequency mode of at least a portion of the network from a fixed frequency mode having a first frequency to a frequency hopping spread spectrum mode having a plurality of the preselected frequencies in response to detection of network interference from a narrow-band noise signal;

determining a second frequency not affected by the narrow-band noise signal in response to the frequency hopping; and sending instructions to the first plurality of communication nodes to thereby switch the radio frequency mode of the at least a portion of the network from the frequency hopping spread spectrum mode to the fixed frequency mode, the fixed frequency mode utilizing the determined second frequency.

21. A computer readable medium that is readable by a host computer collecting utility usage data, positioned remote from a plurality of meter data collectors, the computer readable medium comprising a set of instructions that, when executed by the host computer, cause the host computer to perform the following operations:

requesting utility usage data from each of a plurality of meter data collectors forming a mesh communication network, each meter data collector positioned adjacent at least one of the plurality of utility meters to collect utility usage data therefrom, the mesh communication network having a variable radio frequency mode adapted to vary between a fixed radio frequency mode and a frequency hopping spread spectrum mode;

receiving a strength of a communication signal between each of the plurality of meter data collectors;

determining a preferred polling sequence route in response to the strength of a communication signal between the each of the plurality of meter data collectors to thereby form a preferred communication sequence path;

providing instructions to the plurality of meter data collectors to vary the radio frequency mode between a fixed radio frequency mode and a frequency hopping spread spectrum mode in response to detection of substantial network interference along the preferred polling sequence route to enhance mesh communication network performance, the instructions to select the frequency hopping spread spectrum mode to circumvent substantial network interference when encountering substantial network interference, instructions to select the fixed radio frequency mode to provide message broadcasting across at least portions of the network when not encountering substantial network interference;

polling each of the plurality of meter data collectors with the preferred polling sequence; and receiving utility usage data from each of the plurality of meter data collectors along the preferred polling sequence route in response to the polling.

22. A computer readable medium as defined in claim 21, wherein the operations of polling and determining are periodically performed to update the preferred polling sequence route over time, the preferred communication sequence path maximizing a number of meter data collectors in the communications path.

23. A computer readable medium as defined in claim 21, further comprising a set of instructions that, when executed by the host computer, cause the host computer to perform the following operations:

providing instructions to the plurality of meter data collectors to thereby switch the radio frequency mode of at least a portion of the network from a fixed frequency mode having a first frequency to a frequency hopping spread spectrum mode having a plurality of the preselected frequencies in response to detection of network interference from a narrow-band noise signal;

determining a second frequency not affected by the narrow-band noise signal, in response to the frequency hopping; and providing instructions to the plurality of meter data collectors to thereby switch the radio frequency mode of the at least a portion of the network from the frequency hopping spread spectrum mode to the fixed frequency mode, the fixed frequency mode utilizing the determined second frequency.

24. A computer readable medium as defined in claim 21, wherein the host computer is a first computer in communication with a second computer positioned to form a network communication node defining a field host data collector, and wherein the computer readable medium further comprises a set of instructions that, when executed by the field host data collector, cause the field host data collector to perform the following operations:

receiving collected utility usage data from the plurality of meter data collectors;

storing the collected utility usage data for each of the plurality of meter data collectors in a database of utility usage readings associated with the plurality of meter data collectors and located in memory of the field host data collector to define a consumption file, the utility usage data stored in batch format in the consumption file to enhance utility usage data processing and customer billing; and sending the consumption file from the field host data collector to the host computer to thereby store and batch process the collected utility usage data.

25. A computer readable medium that is readable by a host computer collecting utility usage data from a plurality of utility meters having utility meter sensors in communication with a plurality of communication nodes forming a mesh communication network having a variable radio frequency mode, the computer readable medium comprising a set of instructions that, when executed by the computer, cause the computer to perform the following operations:

determining a communication sequence to each of the plurality of communication nodes in response to a determined strength of a communication signal between each of the plurality of communication nodes to define a preferred communication sequence path from the host computer to each of the plurality of communication nodes; and providing instructions to the plurality of communication nodes to thereby vary the radio frequency mode of the network between a fixed radio frequency mode and a frequency hopping spread spectrum mode in response to detection of substantial network interference along the preferred communication sequence path to enhance mesh communication network performance, the fixed radio frequency mode selected to provide message broadcasting across at least portions of the network when not encountering substantial network interference, the frequency hopping spread spectrum mode selected to circumvent substantial network interference when encountering substantial network interference.

26. A computer readable medium as defined in claim 25, further comprising a set of instructions that, when executed by the computer, cause the computer to perform the following operations:
  updating the preferred communication sequence path to allow the preferred communication sequence path to vary over time, the preferred communication sequence path maximizing a number of communication nodes in the communications path for at least a portion of the mesh indication network.

27. A computer readable medium as defined in claim 25, further comprising a set of instructions that, when executed by the computer, cause the computer to perform the following operations:
  providing instructions to the plurality of communication nodes to thereby switch the radio frequency mode of at least a portion of the network from a fixed frequency mode having a first frequency to a frequency hopping spread spectrum mode having a plurality of the preselected frequencies in response to detection of network interference from a narrow-band noise signal along the preferred communication sequence path;
  determining a second frequency not affected by the narrow-band noise signal, in response to the frequency hopping; and
  providing instructions to the plurality of communication nodes to thereby switch the radio frequency mode of the at least a portion of the network from the frequency hopping spread spectrum mode to the fixed frequency mode, the fixed frequency mode utilizing the determined second frequency.

28. A computer readable medium that is readable by a computer collecting utility usage data, the computer readable medium comprising a set of instructions that, when executed by the computer, cause the computer to perform the following operations:
  initiating polling of a first plurality of communication nodes in a mesh communication network having a variable radio frequency mode adapted to vary between a fixed radio frequency mode and a frequency hopping spread spectrum mode, each of the plurality of communication nodes individually attempted to be polled to thereby determine a strength of communication signal between a host computer and each of a second plurality of communication nodes, each of the first plurality of communication nodes also attempting to communicate with each other in response to initiating polling to thereby determine a strength of communication signal between each one of the first plurality of communications nodes and another one of the first plurality of communication nodes;
  determining a communication sequence to each of the first plurality of communication nodes in response to the determined strength of the communication signal between the host computer and each of the second plurality of communication nodes and the determined strength of the communication signal between each one of the first plurality of communication nodes and another one of the first plurality of communication nodes to define a preferred communication sequence path from the host computer to each of the first plurality of communication nodes;
  periodically performing polling and determining to update the preferred polling sequence path over time, the preferred communication sequence path maximizing a number of communication nodes in the communications path for at least a portion of the mesh communication network; and
  providing instructions to the plurality of communication nodes to vary the radio frequency mode between the fixed radio frequency mode and the frequency hopping spread spectrum mode in response to detection of substantial network interference along the preferred polling sequence path to enhance mesh communication network performance, the instructions to select the frequency hopping spread spectrum mode to circumvent substantial network interference when encountering substantial network interference, instructions to select the fixed radio frequency mode to provide message broadcasting across at least portions of the network when not encountering substantial network interference.

29. A method of collecting utility usage data from a plurality of utility meters having utility meter sensors in communication with a plurality of communication nodes forming a mesh communication network having a variable radio frequency mode, the method comprising the steps of:
  determining a communication sequence to each of the plurality of communication nodes in response to a determined strength of communication signals between each of the plurality of communication nodes to define a preferred communication sequence path from the host computer to each of the plurality of communication nodes; and
  varying the radio frequency mode of the network between a fixed radio frequency mode and a frequency hopping spread spectrum mode, to enhance mesh communication network performance, the fixed radio frequency mode is selected to provide message broadcasting across at least portions of the network when not encountering substantial network interference, the frequency hopping spread spectrum mode is selected to circumvent substantial network interference when substantial network interference is detected.

30. A method as defined in claim 29 further comprising the steps of:
  updating the preferred communication sequence path to allow the preferred communication sequence path to vary over time, the preferred communication sequence path maximizing a number of communication nodes in the communications path for at least a portion of the mesh indication network.

31. A method as defined in claim 29, further comprising the steps of:
  switching the radio frequency mode of at least a portion of the network from a fixed frequency mode having a first frequency to a frequency hopping spread spectrum mode having a plurality of the preselected frequencies, in response to detection of network interference from a narrow-band noise signal;
  determining a second frequency not affected by the narrow-band noise signal, in response to the frequency hopping; and
  switching the radio frequency mode of the at least a portion of the network from the frequency hopping spread spectrum mode to the fixed frequency mode, the fixed frequency mode utilizing the determined second frequency.

* * * * *